US010566627B2

(12) United States Patent
Yamamoto

(10) Patent No.: US 10,566,627 B2
(45) Date of Patent: Feb. 18, 2020

(54) SLURRY COMPOSITION FOR NEGATIVE ELECTRODE FOR LITHIUM-ION SECONDARY BATTERY, NEGATIVE ELECTRODE FOR LITHIUM-ION SECONDARY BATTERY, AND LITHIUM-ION SECONDARY BATTERY

(71) Applicant: ZEON CORPORATION, Tokyo (JP)

(72) Inventor: Norikazu Yamamoto, Kanagawa (JP)

(73) Assignee: ZEON CORPORATION, Tokyo (JP)

( * ) Notice: Subject to any disclaimer, the term of this patent is extended or adjusted under 35 U.S.C. 154(b) by 821 days.

(21) Appl. No.: 14/773,712

(22) PCT Filed: Mar. 20, 2014

(86) PCT No.: PCT/JP2014/001655
§ 371 (c)(1),
(2) Date: Sep. 8, 2015

(87) PCT Pub. No.: WO2014/148064
PCT Pub. Date: Sep. 25, 2014

(65) Prior Publication Data
US 2016/0036055 A1    Feb. 4, 2016

(30) Foreign Application Priority Data

Mar. 22, 2013  (JP) ................................ 2013-060809

(51) Int. Cl.
| | | |
|---|---|---|
| *H01M 4/62* | (2006.01) | |
| *H01M 4/36* | (2006.01) | |
| *H01M 4/38* | (2006.01) | |
| *H01M 4/587* | (2010.01) | |
| *H01M 4/133* | (2010.01) | |
| *H01M 4/134* | (2010.01) | |
| *H01M 4/1395* | (2010.01) | |
| *H01M 4/1393* | (2010.01) | |
| *H01M 4/04* | (2006.01) | |
| *H01M 4/1391* | (2010.01) | |
| *H01M 4/48* | (2010.01) | |
| *H01M 10/0525* | (2010.01) | |
| *H01M 4/02* | (2006.01) | |

(52) U.S. Cl.
CPC ......... *H01M 4/622* (2013.01); *H01M 4/0404* (2013.01); *H01M 4/133* (2013.01); *H01M 4/134* (2013.01); *H01M 4/1391* (2013.01); *H01M 4/1393* (2013.01); *H01M 4/1395* (2013.01); *H01M 4/364* (2013.01); *H01M 4/386* (2013.01); *H01M 4/48* (2013.01); *H01M 4/587* (2013.01); *H01M 10/0525* (2013.01); *H01M 2004/027* (2013.01)

(58) Field of Classification Search
CPC ....................................................... H01M 4/622
See application file for complete search history.

(56) References Cited

U.S. PATENT DOCUMENTS

| 9,203,091 B2 * | 12/2015 | Yasuda | H01M 4/02 |
| 2013/0252106 A1 * | 9/2013 | Numata | H01M 4/485 429/220 |
| 2015/0044559 A1 * | 2/2015 | Toyoda | H01M 4/13 429/217 |

FOREIGN PATENT DOCUMENTS

| JP | 2000-067871 A | 3/2000 |
| JP | 2006-048932 A | 2/2006 |
| JP | 2010-040228 A | 2/2010 |
| JP | 2013-004241 A | 1/2013 |
| WO | 2011/001848 A1 | 1/2011 |
| WO | 2011/037254 A1 | 3/2011 |
| WO | 2012/026462 A1 | 3/2012 |
| WO | 2013/031690 A1 | 3/2013 |

OTHER PUBLICATIONS

Kei Kobayashi et al., WO-2012026462-A1, published Mar. 1, 2012, obtained from patentscope.wipo.int (Year: 2012).*
Kaoru Inoue et al., JP-2000067871-A, published Mar. 3, 2000, obtained from Espacenet.com (Year: 2000).*
International Preliminary Report on Patentability and Translation of Written Opinion of the International Searching Authority; PCT/JP2014/001655 dated Sep. 22, 2015.
The extended European search report issued by the European Patent Office dated Nov. 7, 2016, which corresponds to European Patent Application No. 14770919.0-1360 and is related to U.S. Appl. No. 14/773,712.
International Search Report for PCT/JP2014/001655 dated Jun. 3, 2014.

* cited by examiner

*Primary Examiner* — Jeremiah R Smith
(74) *Attorney, Agent, or Firm* — Studebaker & Brackett PC

(57) ABSTRACT

A slurry composition includes a negative electrode active material, a particulate binder, a water soluble polymer, and water. The particulate binder includes a first particulate binder and a second particulate binder. The first particulate binder includes a copolymer (A) including an aliphatic conjugated diene monomer unit and an aromatic vinyl monomer unit, has a degree of swelling in electrolysis solution of 110% to 200% by mass, has a glass transition temperature of −30° C. to 60° C., and has a gel content of 70% to 98% by mass. The second particulate binder includes a copolymer (B) including an aliphatic conjugated diene monomer unit and an aromatic vinyl monomer unit, has a degree of swelling in electrolysis solution of 250% to 600% by mass, and has a gel content of 70% to 98% by mass.

11 Claims, No Drawings

SLURRY COMPOSITION FOR NEGATIVE ELECTRODE FOR LITHIUM-ION SECONDARY BATTERY, NEGATIVE ELECTRODE FOR LITHIUM-ION SECONDARY BATTERY, AND LITHIUM-ION SECONDARY BATTERY

TECHNICAL FIELD

This disclosure relates to a slurry composition for a negative electrode for a lithium ion secondary battery, a negative electrode for a lithium ion secondary battery, and a lithium ion secondary battery.

BACKGROUND

Lithium ion secondary batteries have the characteristics of being small, lightweight, and high in energy density. Such batteries can also be repeatedly charged and discharged and are used for a variety of purposes. Therefore, in recent years, improvements to battery members such as electrodes have been examined in order to further increase the performance of lithium ion secondary batteries.

An electrode for a lithium ion secondary battery generally includes a current collector and an electrode mixed material layer formed on the current collector. The electrode mixed material layer is formed by, for example, applying a slurry composition onto the current collector and drying the slurry composition. The slurry composition is formed by, for example, dispersing an electrode active material and a binder in a dispersion medium, also blending in a conductive material and the like as necessary. In order to further increase the performance of lithium ion secondary batteries, in recent years, attempts have been made to improve each of the materials blended into the slurry composition used to form the electrode mixed material layer.

For example, regarding a slurry composition for a negative electrode used to form the negative electrode for a lithium ion secondary battery, it has been proposed to increase the performance of the lithium ion secondary battery by improving the binder. Specifically, for example JP2010-40228A (PTL 1) proposes a slurry composition for a negative electrode that uses a binder including a polymer latex (a) that has a number average particle size of 80 nm to 120 nm, a glass transition temperature of 5° C. to 50° C., and a toluene gel content of 70% or more, and a polymer latex (b) that has a number average particle size of 150 nm to 280 nm, a glass transition temperature of −50° C. to 0° C., and a toluene gel content of 70% or more. JP2000-67871A (PTL 2), for example, proposes a slurry composition for a negative electrode that uses a binder including (a) a styrene-butadiene copolymer with a bound styrene content of 20% by mass or more to 70% by mass or less and (b) a styrene-butadiene copolymer with a bound styrene content of 80% by mass or more to less than 100% by mass.

CITATION LIST

Patent Literature

PTL 1: JP2010-40228A
PTL 2: JP2000-67871A

SUMMARY

Technical Problem

In lithium ion secondary batteries, as a result of charging and discharging, the electrode active material included in the negative electrode (hereinafter referred to as "negative electrode active material") sometimes expands and contracts. As expansion and contraction of the negative electrode active material is repeated, the negative electrode gradually swells and the secondary battery changes shape, which may cause the electrical characteristics, such as cycle characteristics, to worsen.

Therefore, in a lithium ion secondary battery, there is a demand for improving the electrical characteristics, such as cycle characteristics, by suppressing swelling of the negative electrode due to charging and discharging.

In a negative electrode for a lithium ion secondary battery, there is a demand for preventing the negative electrode active material from coming off the current collector, even when the negative electrode active material expands and contracts due to charging and discharging, by suitably binding particles of the negative electrode active material to each other and the negative electrode active material to the current collector with a binder. There is also a demand for guaranteeing conductivity of lithium ions in the electrode mixed material layer (negative electrode mixed material layer) when the negative electrode is immersed in an electrolysis solution. In other words, in a negative electrode for a lithium ion secondary battery, there is a demand for improving close adherence between the negative electrode mixed material layer and the current collector while also guaranteeing conductivity of the lithium ions in the negative electrode mixed material layer within the electrolysis solution and improving electrical characteristics such as cycle characteristics and rate characteristics.

In a negative electrode formed using the above conventional slurry compositions for a negative electrode, it is not possible to achieve a suppression of the swelling of the negative electrode due to charging and discharging, an improvement in the close adherence between the negative electrode mixed material layer and the current collector, and a guarantee of conductivity of the lithium ions in the negative electrode mixed material layer all together with a sufficiently high degree. Therefore, in a negative electrode formed using the above conventional slurry compositions for a negative electrode and in a lithium ion secondary battery that uses the negative electrode, there is still room for improvement with regard to suppressing swelling of the negative electrode due to charging and discharging while further improving electrical characteristics such as cycle characteristics and rate characteristics.

It could therefore be helpful to provide a negative electrode for a lithium ion secondary battery that can suppress swelling due to charging and discharging while improving electrical characteristics of the lithium ion secondary battery. It could also be helpful to provide a slurry composition for a negative electrode for a lithium ion secondary battery that allows for formation of the above negative electrode for a lithium ion secondary battery.

Furthermore, it could be helpful to provide a lithium ion secondary battery that can suppress swelling of the negative electrode and that has excellent electrical characteristics.

Solution to Problem

After careful examination, I discovered that by using a first particulate binder that has predetermined properties and a second particulate binder that has predetermined properties as the binder, it is possible to suppress swelling of the negative electrode due to charging and discharging while also improving the electrical characteristics of the lithium ion secondary battery.

To solve the aforementioned problems advantageously, a slurry composition for a negative electrode for a lithium ion secondary battery of this disclosure includes a negative electrode active material, a particulate binder, a water soluble polymer, and water. The particulate binder includes a first particulate binder and a second particulate binder, the first particulate binder includes a copolymer (A) including an aliphatic conjugated diene monomer unit and an aromatic vinyl monomer unit, has a degree of swelling in electrolysis solution of 110% by mass or more to 200% by mass or less, has a glass transition temperature of −30° C. or higher to 60° C. or lower, and has a gel content of 70% by mass or more to 98% by mass or less, and the second particulate binder includes a copolymer (B) including an aliphatic conjugated diene monomer unit and an aromatic vinyl monomer unit, has a degree of swelling in electrolysis solution of 250% by mass or more to 600% by mass or less, and has a gel content of 70% by mass or more to 98% by mass or less. In this way, by using a slurry composition that includes, as a binder, a first particulate binder that has predetermined properties and a second particulate binder that has predetermined properties, it is possible to form a lithium ion secondary battery negative electrode that can suppress swelling due to charging and discharging while improving electrical characteristics of the lithium ion secondary battery. Furthermore, by using a slurry composition that includes a water soluble polymer in addition to the above-described binder, it is possible to further suppress the swelling, due to charging and discharging, of a lithium ion secondary battery negative electrode formed using the slurry composition.

In the slurry composition for a negative electrode for a lithium ion secondary battery, the second particulate binder preferably has at least one glass transition temperature in a range of −100° C. or higher to lower than 10° C. and at least one glass transition temperature in a range of 10° C. or higher to 100° C. or lower. The reason is that when the second particulate binder has at least one glass transition temperature in a range of −100° C. or higher to lower than 10° C. and at least one glass transition temperature in a range of 10° C. or higher to 100° C. or lower, then the second particulate binder can be endowed with suitable elasticity upon using the negative electrode formed with the slurry composition, thereby improving the electrical characteristics of the lithium ion secondary battery.

In the slurry composition for a negative electrode for a lithium ion secondary battery, in terms of solid content, 1 part by mass or more to 100 parts by mass or less of the second particulate binder is preferably included per 100 parts by mass of the first particulate binder. The reason is that by setting the amount of the second particulate binder to be 1 part by mass or more to 100 parts by mass or less per 100 parts by mass of the first particulate binder, the swelling, due to charging and discharging, of a lithium ion secondary battery negative electrode formed using the slurry composition can be sufficiently suppressed, and the electrical characteristics of the lithium ion secondary battery, such as the cycle characteristics, can be sufficiently improved.

Furthermore, in the slurry composition for a negative electrode for a lithium ion secondary battery, the particulate binder preferably further includes a third particulate binder, and the third particulate binder preferably includes a copolymer (C) including a (meth)acrylic acid ester monomer unit and has a surface acid content of 0.01 mmol/g or more to 0.10 mmol/g or less. The reason is that by concomitantly using a third particulate binder that has predetermined properties along with the first particulate binder and the second particulate binder, the electrical characteristics of the lithium ion secondary battery, such as low temperature output characteristics, can be improved.

In this description, "(meth)acrylic acid" refers to acrylic acid and/or methacrylic acid.

In the slurry composition for a negative electrode for a lithium ion secondary battery, in terms of solid content, 5 parts by mass or more to 30 parts by mass or less of the third particulate binder is preferably included per 100 parts by mass of the particulate binder. The reason is that by setting the amount of the third particulate binder to be 5 parts by mass or more to 30 parts by mass or less per 100 parts by mass of the particulate binder, it is possible to sufficiently improve the electrical characteristics of the lithium ion secondary battery, such as low temperature output characteristics, while also sufficiently guaranteeing the amount of the first particulate binder and the second particulate binder, suppressing swelling of the negative electrode due to charging and discharging, and improving the electrical characteristics of the lithium ion secondary battery.

In the slurry composition for a negative electrode for a lithium ion secondary battery, the negative electrode active material preferably includes a carbon-based negative electrode active material and a silicon-based negative electrode active material. The reason is that when the negative electrode active material includes a carbon-based negative electrode active material and a silicon-based negative electrode active material, it is possible to increase the capacity of a lithium ion secondary battery that uses the lithium ion secondary battery negative electrode formed with the slurry composition, while also utilizing the first particulate binder, second particulate binder, and water soluble polymer to suppress an increase in swelling of the negative electrode that uses the silicon-based negative electrode active material.

In the slurry composition for a negative electrode for a lithium ion secondary battery, 1 part by mass or more to 100 parts by mass or less of the silicon-based negative electrode active material is preferably included per 100 parts by mass of the carbon-based negative electrode active material. The reason is that when the negative electrode active material includes 1 part by mass or more to 100 parts by mass or less of the silicon-based negative electrode active material per 100 parts by mass of the carbon-based negative electrode active material, it is possible to increase the capacity of a lithium ion secondary battery that uses the lithium ion secondary battery negative electrode formed with the slurry composition, while also utilizing the first particulate binder, second particulate binder, and water soluble polymer to suppress an increase in swelling of a negative electrode that uses the silicon-based negative electrode active material.

In the slurry composition for a negative electrode for a lithium ion secondary battery, the silicon-based negative electrode active material preferably includes SiO$_x$ (where $0.01 \leq x < 2$) containing (i) at least one of SiO and SiO$_2$ and (ii) Si. The reason is that when the silicon-based negative electrode active material includes SiO$_x$, it is possible to suppress an increase in the change in volume of the negative electrode active material at the time of charging and discharging, while also increasing the capacity of a lithium ion secondary battery that uses the lithium ion secondary battery negative electrode formed with the slurry composition.

In the slurry composition for a negative electrode for a lithium ion secondary battery, the silicon-based negative electrode active material preferably includes a complex compound of a Si-containing material and conductive carbon. The reason is that when the silicon-based negative electrode active material includes a complex compound of a Si-containing material and conductive carbon, it is possible to suppress an increase in the change in volume of the negative electrode active material at the time of charging and discharging, while also sufficiently increasing the capacity of a lithium ion secondary battery that uses the lithium ion secondary battery negative electrode formed with the slurry composition.

To solve the aforementioned problems advantageously, a negative electrode for a lithium ion secondary battery of this disclosure is formed by applying the above-described slurry composition for a negative electrode for a lithium ion secondary battery onto a current collector, and drying the slurry composition for a negative electrode for a lithium ion secondary battery that was applied onto the current collector so as to form a negative electrode mixed material layer on the current collector. By thus forming the negative electrode mixed material layer using the above-described slurry composition for a negative electrode for a lithium ion secondary battery, it is possible to suppress swelling of the negative electrode due to charging and discharging while also improving the electrical characteristics of a lithium ion secondary battery that uses the negative electrode.

To solve the aforementioned problems advantageously, a lithium ion secondary battery of this disclosure includes the above-described negative electrode for a lithium ion secondary battery. By using the above-described negative electrode for a lithium ion secondary battery, it is possible to suppress swelling of the negative electrode due to repeated charging and discharging, while also attaining excellent electrical characteristics.

Advantageous Effect

The disclosed slurry composition for a negative electrode for a lithium ion secondary battery allows for the formation of a negative electrode for a lithium ion secondary battery that can both suppress swelling due to charging and discharging and can improve the electrical characteristics of the lithium ion secondary battery.

The disclosed negative electrode for a lithium ion secondary battery both allows for suppression of swelling due to charging and discharging and also for improvement in the electrical characteristics of the lithium ion secondary battery.

Furthermore, the disclosed lithium ion secondary battery can both suppress swelling of the negative electrode and can attain excellent electrical characteristics.

DETAILED DESCRIPTION

The following describes embodiments in detail.

The disclosed slurry composition for the negative electrode for a lithium ion secondary battery is used when forming the negative electrode for a lithium ion secondary battery. The disclosed negative electrode for a lithium ion secondary battery may be produced using the disclosed slurry composition for the negative electrode for a lithium ion secondary battery. The disclosed lithium ion secondary battery uses the disclosed negative electrode for a lithium ion secondary battery.

(Slurry Composition for the Negative Electrode for a Lithium Ion Secondary Battery)

The disclosed slurry composition for the negative electrode for a lithium ion secondary battery is an aqueous slurry composition using an aqueous medium as a dispersion medium and includes a negative electrode active material, a particulate binder, a water soluble polymer, and water. The disclosed slurry composition for the negative electrode for a lithium ion secondary battery concomitantly uses particulate binders (I) and (II) below as the particulate binder.

(I) A first particulate binder that includes a copolymer (A) including an aliphatic conjugated diene monomer unit and an aromatic vinyl monomer unit, has a degree of swelling in electrolysis solution of 110% by mass or more to 200% by mass or less, has a glass transition temperature of $-30°$ C. or higher to $60°$ C. or lower, and has a gel content of 70% by mass or more to 98% by mass or less (II) A second particulate binder that includes a copolymer (B) including an aliphatic conjugated diene monomer unit and an aromatic vinyl monomer unit, has a degree of swelling in electrolysis solution of 250% by mass or more to 600% by mass or less, and has a gel content of 70% by mass or more to 98% by mass or less In this disclosure, the "degree of swelling in electrolysis solution", "gel content", and "glass transition temperature" of the particulate binder can be measured using the measurement method described in the Examples of this disclosure. Furthermore, in this disclosure, the expression "includes a monomer unit" means "a structural unit derived from a monomer is included in the polymer obtained using the monomer".

<Negative Electrode Active Material>

The negative electrode active material is an electrode active material for a negative electrode. This material transfers electrons at the negative electrode for the lithium ion secondary battery.

As the negative electrode active material of a lithium ion secondary battery, a material that can store and emit lithium is normally used. Examples of materials that can store and emit lithium include a carbon-based negative electrode active material, a metallic negative electrode active material, and a negative electrode active material combining the two.

A carbon-based negative electrode active material refers to an active material that has carbon as the main skeleton and that can have lithium inserted (doped) therein. Examples of the carbon-based negative electrode active material include a carbonaceous material and a graphitic material.

The carbonaceous material is a material with a low degree of graphitization (i.e. a low crystallinity) and is obtained by carbonizing a carbon precursor through heat treatment at $2000°$ C. or lower. While there is no lower limit on the heat treatment temperature at the time of carbonization, a lower limit of $500°$ C. or higher, for example, may be set.

Examples of the carbonaceous material include easily graphitizable carbon that easily changes the structure of carbon depending on the heat treatment temperature, and non-graphitizable carbon that has a structure close to a non-crystalline structure, as typified by vitreous carbon.

Examples of easily graphitizable carbon include carbon material having, as a source material, tar pitch obtained from petroleum or coal. Specific examples include coke, mesocarbon microbead (MCMB), mesophase pitch-based carbon fiber, pyrolytic vapor-grown carbon fiber, and the like.

Examples of the non-graphitizable carbon include a phenolic resin burned substance, polyacrylonitrile-based carbon fiber, quasi-isotropic carbon, furfuryl alcohol resin burned substance (PFA), hard carbon, and the like.

The graphitic material is a material obtained by heat treatment of easily graphitizable carbon at $2000°$ C. or higher and has a high crystallinity, near that of graphite. While there is no upper limit on the heat treatment temperature, an upper limit of $5000°$ C. or lower, for example, may be set.

Examples of the graphitic material include natural graphite, artificial graphite, and the like.

Examples of artificial graphite include artificial graphite resulting from heat treatment, mainly at 2500° C. or higher, of carbon that contains easily graphitizable carbon; graphitized MCMB resulting from heat treatment, at 2000° C. or higher, of MCMB; graphitized mesophase pitch-based carbon fiber resulting from heat treatment, at 2000° C. or higher, of mesophase pitch-based carbon fiber; and the like.

The metallic negative electrode active material refers to an active material that includes a metal and typically includes, in the structure thereof, an element that allows for insertion of lithium. When lithium is inserted, this active material typically has a theoretical capacitance per unit mass of 500 mAh/g or more. Examples of the metallic active material include lithium metal, a simple substance of metal (such as Ag, Al, Ba, Bi, Cu, Ga, Ge, In, Ni, P, Pb, Sb, Si, Sn, Sr, Zn, Ti, or the like) that can form lithium alloy and alloys thereof, and oxides, sulfides, nitrides, silicides, carbides, phosphides, and the like thereof.

Among metallic negative electrode active materials, an active material including silicon (a silicon-based negative electrode active material) is preferable. The reason is that using a silicon-based negative electrode active material allows for increased capacity of the lithium ion secondary battery.

Examples of the silicon-based negative electrode active material include silicon (Si); alloys of silicon and cobalt, nickel, iron, and the like; $SiO_x$; a mixture of Si-containing material and carbon material; a complex compound of a Si-containing material and conductive carbon yielded by covering Si-containing material with conductive carbon or by conjugating Si-containing material and conductive carbon; and the like.

$SiO_x$ is a compound including (i) at least one of SiO and $SiO_2$ and (ii) Si, and x is normally 0.01 or more to less than 2. SiO may, for example, be formed using a dismutation reaction of silicon monoxide (SiO). Specifically, SiO may be prepared by applying heat treatment to SiO in the presence of any polymer such as polyvinyl alcohol or the like to generate silicon and silicon dioxide. The heat treatment may be performed under an inert gas atmosphere after grinding and mixing SiO and any polymer.

Examples of a mixture of Si-containing material and carbon material include the result of grinding and mixing a Si-containing material such as silicon, $SiO_x$, or the like and a carbon material such as a carbonaceous material, a graphitic material, or the like in the presence of any polymer such as polyvinyl alcohol. As the carbonaceous material or graphitic material, a material that can be used as a carbon-based negative electrode active material may be used.

Examples of the complex compound of a Si-containing material and conductive carbon include a compound yielded by applying heat treatment, for example under an inert gas atmosphere, to a ground mixture of SiO, a polymer such as polyvinyl alcohol, and any carbon material. Using a high temperature for the heat treatment applied to the ground mixture generates a complex compound (Si—$SiO_x$—C composite) in which SiO generated by a dismutation reaction of SiO is dispersed into the matrix of conductive carbon constituted by a carbonized polymer and a carbon material blended as an optional component. Using a relatively low temperature for the heat treatment applied to the ground mixture generates a complex compound (SiO—C) in which a portion of the Si in the SiO is replaced by conductive carbon.

When using a carbon-based negative electrode active material or a metallic negative electrode active material as the negative electrode active material, these negative electrode active materials expand and contract due to charging and discharging. Therefore, when using these negative electrode active materials, there is typically a chance that electrical characteristics, such as cycle characteristics, will worsen by the negative electrode gradually expanding and the secondary battery changing shape due to repeated expansion and contraction of the negative electrode active material. In particular, when using a silicon-based negative electrode active material as the negative electrode active material, the swelling of the negative electrode is significant at the start of use of the lithium ion secondary battery, and the electrical characteristics worsen. In a negative electrode formed using the disclosed slurry composition for the negative electrode for a lithium ion secondary battery, however, two types of particulate binders having predetermined properties are concomitantly used, and a water soluble polymer is also used. Hence, both at the start of use of the lithium ion secondary battery and after repeated charging and discharging, swelling of the negative electrode due to expansion and contraction of the negative electrode active material is suppressed, improving the electrical characteristics such as cycle characteristics.

If the above silicon-based negative electrode active material is used, the capacity of the lithium ion secondary battery can be increased, yet in general, silicon-based negative electrode active material expands and contracts greatly (for example, to approximately five times) due to charging and discharging. From the perspective of sufficiently suppressing the occurrence of swelling of the negative electrode while increasing the capacity of the lithium ion secondary battery, a mixture of carbon-based negative electrode active material and silicon-based negative electrode active material is preferably used as the negative electrode active material.

When using a mixture of carbon-based negative electrode active material and silicon-based negative electrode active material as the negative electrode active material, from the perspective of sufficiently suppressing the occurrence of swelling of the negative electrode while also sufficiently increasing the capacity of the lithium ion secondary battery, artificial graphite is preferably used as the carbon-based negative electrode active material, and one or more selected from the group consisting of Si, $SiO_x$, a mixture of a Si-containing material and a carbon material, and a complex compound of a Si-containing material and conductive carbon is preferably used as the silicon-based negative electrode active material. A complex compound of a Si-containing material and conductive carbon is more preferably used as the silicon-based negative electrode active material, and a complex compound such that $SiO_x$ is dispersed into the matrix of conductive carbon (Si—$SiO_x$—C composite) is particularly preferable. These negative electrode active materials can absorb and discharge a relatively large amount of lithium yet have a relatively small change in volume when absorbing and discharging lithium. Therefore, by using these negative electrode active materials, it is possible to suppress an increase in the change in volume of the negative electrode active material at the time of charging and discharging, while also sufficiently increasing the capacity of a lithium ion secondary battery that uses the lithium ion secondary battery negative electrode formed with the slurry composition.

When using a mixture of carbon-based negative electrode active material and silicon-based negative electrode active material as the negative electrode active material, from the perspective of sufficiently suppressing the occurrence of swelling of the negative electrode while also sufficiently increasing the capacity of the lithium ion secondary battery, the negative electrode active material preferably includes 1 part by mass or more to 100 parts by mass or less of the silicon-based negative electrode active material per 100 parts by mass of the carbon-based negative electrode active material, more preferably 1 part by mass or more to 45 parts by mass or less, even more preferably 1 part by mass or more to 20 parts by mass or less, particularly preferably 1 part by mass or more to 15 parts by mass or less, and most preferably 1 part by mass or more to 6 parts by mass or less. The reason is that setting the amount of the silicon-based negative electrode active material per 100 parts by mass of the carbon-based negative electrode active material to be 1 part by mass or more sufficiently increases the capacity of the lithium ion secondary battery. Furthermore, setting the amount of the silicon-based negative electrode active material per 100 parts by mass of the carbon-based negative electrode active material to be 100 parts by mass or less sufficiently suppresses the occurrence of swelling of the negative electrode.

The particle size and specific surface area of the negative electrode active material are not limited and may be similar to those of a conventionally used negative electrode active material.

<Particulate Binder>

The particulate binder is a component that, in a negative electrode produced by forming a negative electrode mixed material layer on the current collector using the disclosed slurry composition, can retain components included in the negative electrode mixed material layer to prevent the components from separating from the negative electrode mixed material layer. When immersed in an electrolysis solution, the particulate binder in the negative electrode mixed material layer generally maintains a granular shape while absorbing the electrolysis solution and swelling, so as to bind particles of the negative electrode active material to each other and prevent the negative electrode active material from coming off the current collector. The particulate binder also fulfills the function of binding particles other than the negative electrode active material included in the negative electrode mixed material layer to maintain strength of the negative electrode mixed material layer.

In the disclosed slurry composition, in order to suppress swelling, due to charging and discharging, of the negative electrode formed using the slurry composition and also improve electrical characteristics of the lithium ion secondary battery that uses the negative electrode (such as cycle characteristics and charge acceptance), the following first particulate binder and second particulate binder are used concomitantly as a particulate binder. The disclosed slurry composition may include, as the particulate binder, a third particulate binder that does not fall into the first particulate binder and the second particulate binder.

[First Particulate Binder]

The first particulate binder is a binder that includes a copolymer (A) including an aliphatic conjugated diene monomer unit and an aromatic vinyl monomer unit, and more preferably is a binder composed of a copolymer (A) including an aliphatic conjugated diene monomer unit and an aromatic vinyl monomer unit.

The first particulate binder needs to have a degree of swelling in electrolysis solution of 110% by mass or more to 200% by mass or less, a glass transition temperature of −30° C. or higher to 60° C. or lower, and a gel content of 70% by mass or more to 98% by mass or less.

When forming a negative electrode using the disclosed slurry composition, the first particulate binder achieves the functions of guaranteeing close adherence between the negative electrode mixed material layer and the current collector and of guaranteeing conductivity of lithium ions in the negative electrode mixed material layer when the negative electrode is immersed in an electrolysis solution while also suppressing swelling of the negative electrode.

Therefore, the copolymer (A) is used in the first particulate binder, and the copolymer (A) includes an aliphatic conjugated diene monomer unit that is a flexible repeating unit with low rigidity and can increase the close adherence between the negative electrode mixed material layer and the current collector and an aromatic vinyl monomer unit that can reduce solubility of a polymer in electrolysis solution and increase the stability of the particulate binder.

The content percentage of the aromatic vinyl monomer unit in the copolymer (A) is, with respect to the total amount of the aliphatic conjugated diene monomer unit and the aromatic vinyl monomer unit, preferably 42% by mass or more, more preferably 49% by mass or more, even more preferably 55% by mass or more, and preferably 87% by mass or less, more preferably 80% by mass or less, and even more preferably 70% by mass or less. If the content percentage of the aromatic vinyl monomer unit (aromatic vinyl monomer unit/(aliphatic conjugated diene monomer unit+ aromatic vinyl monomer unit)) is less than 42% by mass, the flexibility of the first particulate binder becomes too high, and the function of suppressing swelling of the negative electrode might not be sufficiently achieved. If the content percentage of the aromatic vinyl monomer unit exceeds 87% by mass, the flexibility of the first particulate binder may worsen, the close adherence between the negative electrode mixed material layer and the current collector may worsen, and electrical characteristics such as cycle characteristics may worsen.

From the perspective of suppressing swelling of the negative electrode due to charging and discharging, and improving the electrical characteristics such as cycle characteristics, the first particulate binder is set to have a degree of swelling in electrolysis solution of 200% by mass or less, a glass transition temperature of −30° C. or higher, and a gel content of 70% by mass or more. If at least one of the degree of swelling in electrolysis solution, glass transition temperature, and gel content deviates from the above ranges, swelling of the negative electrode cannot be suppressed, and the electrical characteristics of the lithium ion secondary battery worsen.

From the perspective of sufficiently suppressing swelling of the negative electrode and sufficiently improving the electrical characteristics, the degree of swelling in electrolysis solution is preferably 190% by mass or less, more preferably 180% by mass or less, and even more preferably 150% by mass or less. The glass transition temperature is preferably −20° C. or higher and more preferably −10° C. or higher. Furthermore, the gel content is preferably 80% by mass or more, more preferably 85% by mass or more, and even more preferably 90% by mass or more.

Furthermore, in the first particulate binder, the degree of swelling in electrolysis solution needs to be 110% by mass or more from the perspective of guaranteeing conductivity of lithium ions within the negative electrode mixed material layer formed using the slurry composition. When the degree of swelling in electrolysis solution deviates from the above range, conductivity of lithium ions within the negative electrode mixed material layer cannot be guaranteed, and electrical characteristics such as cycle characteristics worsen. From the perspective of guaranteeing close adherence between the negative electrode mixed material layer and the current collector while preventing the occurrence of the electrode plate becoming too firm and cracking during charging or discharging, in the first particulate binder, the gel content is preferably 98% by mass or less, and the glass transition temperature is preferably 60° C. or lower. If the gel content deviates from the above range, the close adherence between the negative electrode mixed material layer and the current collector worsens, and the electrical characteristics such as cycle characteristics worsen. If the glass transition temperature deviates from the above range, the electrode plate cracks, and the electrical characteristics such as cycle characteristics worsen.

From the perspective of sufficiently improving the electrical characteristics such as cycle characteristics, the degree of swelling in electrolysis solution is preferably 120% by mass or more, and more preferably 130% by mass or more. The glass transition temperature is preferably 40° C. or lower, more preferably 30° C. or lower, and even more preferably 20° C. or lower. Furthermore, the gel content is preferably 95% by mass or less and more preferably 93% by mass or less.

The aliphatic conjugated diene monomer that can form the aliphatic conjugated diene monomer unit of the copolymer (A) is not limited. Examples include 1,3-butadiene, 2-methyl-1,3-butadiene, 2,3-dimethyl-1,3-butadiene, 2-chloro-1,3-butadiene, substituted straight-chain conjugated pentadienes, and substituted and side-chain conjugated hexadienes, among which 1,3-butadiene is preferable. It is possible to use only one type of aliphatic conjugated diene monomer or to use two or more types in combination at any ratio.

The aromatic vinyl monomer that can form the aromatic vinyl monomer unit of the copolymer (A) is not limited. Examples include styrene, α-methylstyrene, vinyl toluene, and divinyl benzene, among which styrene is preferable. It is possible to use only one type of aromatic vinyl monomer alone, or to use two or more types in combination at any ratio.

The copolymer (A) is preferably a styrene-butadiene copolymer that includes a 1,3-butadiene unit as the aliphatic conjugated diene monomer unit and includes a styrene unit as the aromatic vinyl monomer unit.

The copolymer (A) used as the first particulate binder may include monomer unit(s) other than the above-described aliphatic conjugated diene monomer unit and aromatic vinyl monomer unit.

Specifically, in addition to an aliphatic conjugated diene monomer unit and an aromatic vinyl monomer unit, the copolymer (A) may include an ethylenically unsaturated carboxylic acid monomer unit. The ethylenically unsaturated carboxylic acid monomer unit is a repeating unit that has high strength and includes a carboxyl group (—COOH group) that enhances adhesiveness to the negative electrode active material and the current collector. Accordingly, the first particulate binder that uses the copolymer (A) that includes an ethylenically unsaturated carboxylic acid monomer unit can stably prevent separation of the negative electrode active material from the negative electrode mixed material layer and can enhance the strength of the negative electrode. Furthermore, swelling of the negative electrode can be better suppressed.

Examples of the ethylenically unsaturated carboxylic acid monomer that can be used to produce the copolymer (A) that includes an ethylenically unsaturated carboxylic acid monomer unit include monocarboxylic acids and dicarboxylic acids such as acrylic acid, methacrylic acid, crotonic acid, maleic acid, fumaric acid, and itaconic acid, and anhydrides thereof. Among these, from the perspective of stability of the disclosed slurry composition, acrylic acid, methacrylic acid, and itaconic acid are preferable as the ethylenically unsaturated carboxylic acid monomer. It is possible to use only one type of ethylenically unsaturated carboxylic acid monomer or to use two or more types in combination at any ratio.

The content percentage of the ethylenically unsaturated carboxylic acid monomer unit in the copolymer (A) is preferably 0.5% by mass or more, more preferably 1% by mass or more, and particularly preferably 2% by mass or more. Furthermore, the content is preferably 10% by mass or less, more preferably 8% by mass or less, and particularly preferably 7% by mass or less. Setting the content percentage of the ethylenically unsaturated carboxylic acid monomer unit to be 0.5% by mass or more improves the stability of the disclosed slurry composition. Setting the content to be 10% by mass or less prevents the viscosity of the disclosed slurry composition from becoming excessively high, thus making the slurry composition easier to handle.

As long as the disclosed effects are not significantly impaired, the copolymer (A) may include an optional repeating unit other than those described above. Examples of a monomer corresponding to this optional repeating unit include a vinyl cyanide monomer, an unsaturated carboxylic acid alkyl ester monomer, an unsaturated monomer including a hydroxyalkyl group, and an unsaturated carboxylic acid amide monomer. It is possible to use only one of the above alone, or to use two or more types in combination at any ratio.

Examples of the vinyl cyanide monomer include acrylonitrile, methacrylonitrile, α-chloroacrylonitrile, and α-ethylacrylonitrile. Among these, acrylonitrile and methacrylonitrile are preferable. It is possible to use only one of the above alone, or to use two or more types in combination at any ratio.

Examples of the unsaturated carboxylic acid alkyl ester monomer include methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, and 2-ethylhexyl acrylate. Among these, methyl methacrylate is preferable. It is possible to use only one of the above alone, or to use two or more types in combination at any ratio.

Examples of the unsaturated monomer having a hydroxyalkyl group include β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di-(ethylene glycol) maleate, di-(ethylene glycol) itaconate, 2-hydroxyethyl maleate, bis(2-hydroxyethyl) maleate, and 2-hydroxyethylmethyl fumarate. Among these, β-hydroxyethyl acrylate is preferable. It is possible to use only one of the above alone, or to use two or more types in combination at any ratio.

Examples of the unsaturated carboxylic acid amide monomer include acrylamide, methacrylamide, N-methylol acrylamide, N-methylol methacrylamide, and N,N-dimethyl acrylamide. Among these, acrylamide and methacrylamide are preferable. It is possible to use only one of the above alone, or to use two or more types in combination at any ratio.

Furthermore, the copolymer (A) may be produced using a monomer used for general emulsion polymerization such as ethylene, propylene, vinyl acetate, vinyl propionate, vinyl chloride, or vinylidene chloride. It is possible to use only one of the above alone, or to use two or more types in combination at any ratio.

The first particulate binder that includes the copolymer (A) may be produced by, for example, polymerization of a monomer composition including the aforementioned monomers in an aqueous solvent.

The content percentage of each monomer in the monomer composition is usually the same as the content percentage of the repeating unit in the desired copolymer (A).

Any aqueous solvent may be used as long as the prepared copolymer (A) can be dispersed therein in particle form. The aqueous solvent is usually selected from aqueous solvents normally having a boiling point at normal pressure of 80° C. or higher and preferably 100° C. or higher, and normally 350° C. or lower and preferably 300° C. or lower.

Examples of the aqueous solvent include water; ketones such as diacetone alcohol and γ-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tert-butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. Among these, water is particularly preferable since it is non-flammable and a dispersion of particles of the copolymer (A) is easily obtainable. Water may be used as a main solvent, with another of the above aqueous solvents other than water being mixed in within a range that ensures the dispersed state of the particles of the copolymer (A).

Any polymerization method may be used, such as solution polymerization, suspension polymerization, bulk polymerization, emulsion polymerization, or the like. As the polymerization method, for example any of ion polymerization, radical polymerization, and living radical polymerization may be used. Among these, emulsion polymerization is particularly preferable from the perspective of production efficiency, because a high molecular weight is easily achieved, and because re-dispersion treatment is unnecessary, since the resulting polymer is already in a state of being dispersed in water, thereby allowing the polymer to be used as is in the production of the slurry composition. The emulsion polymerization may be performed in accordance with a conventional method.

The emulsifier, dispersant, polymerization initiator, polymerization auxiliary agent, chain transfer agent, and the like used in the polymerization may be those generally used, and the amount thereof may be the amount generally used. In the polymerization, seed polymerization using seed particles may be performed. The polymerization conditions may also be selected freely in accordance with the polymerization method, type of polymerization initiator, and the like.

The aqueous dispersion of particles of copolymer (A) obtained by the above-described polymerization methods may be adjusted so that the pH is usually in a range of 5 to 10, preferably 5 to 9, by using an aqueous basic solution containing, for example, a hydroxide of an alkali metal (for example, Li, Na, K, Rb, or Cs), ammonia, an inorganic ammonium compound (for example, $NH_4Cl$ or the like), or an organic amine compound (for example, ethanol amine, diethyl amine, or the like). Among these, pH adjustment using an alkali metal hydroxide is preferable since such pH adjustment improves the binding capacity (peel strength) between the current collector and the negative electrode active material.

The degree of swelling in electrolysis solution, glass transition temperature, and gel content of the first particulate binder may be appropriately adjusted by changing the preparation conditions of the copolymer (A) (such as the monomer that is used, the polymerization conditions, and the like).

Specifically, the degree of swelling in electrolysis solution may, for example, be increased by including an acrylonitrile monomer unit in the copolymer (A) or decreased by increasing the density (entanglement between polymer molecules) of the copolymer (A).

The glass transition temperature can be adjusted by changing the type and amount of monomer that is used. For example, the glass transition temperature can be raised by using a monomer such as styrene or acrylonitrile, and the glass transition temperature can be lowered by using a monomer such as butyl acrylate or butadiene.

Furthermore, the gel content can be adjusted by changing the polymerization temperature, the type of polymerization initiator, the conversion ratio (amount of monomer consumed) when stopping the reaction, and the like. For example, the gel content can be increased by decreasing the amount of chain transfer agent used at the time of polymerization, and the gel content can be decreased by increasing the amount of chain transfer agent used at the time of polymerization.

[Second Particulate Binder]

The second particulate binder is a binder that includes a copolymer (B) including an aliphatic conjugated diene monomer unit and an aromatic vinyl monomer unit, and more preferably is a binder composed of a composite polymer (heterophase structure) that contains a copolymer (B), which includes an aliphatic conjugated diene monomer unit and an aromatic vinyl monomer unit, and another polymer.

The second particulate binder needs to have a degree of swelling in electrolysis solution of 250% by mass or more to 600% by mass or less and a gel content of 70% by mass or more to 98% by mass or less.

When forming a negative electrode using the disclosed slurry composition, the second particulate binder achieves the functions of guaranteeing close adherence between the negative electrode mixed material layer and the current collector and suppressing swelling of the negative electrode while also guaranteeing conductivity of lithium ions in the negative electrode mixed material layer when the negative electrode is immersed in an electrolysis solution.

Therefore, like the first particulate binder, at least the copolymer (B) is used in the second particulate binder, and the copolymer (B) includes an aliphatic conjugated diene monomer unit that is a flexible repeating unit with low rigidity and can increase the close adherence between the negative electrode mixed material layer and the current collector and an aromatic vinyl monomer unit that can reduce solubility of a polymer in electrolysis solution and increase the stability of the particulate binder.

The copolymer (B) may be prepared by using the same monomer as the copolymer (A), and other than adjusting the degree of swelling in electrolysis solution and the gel content, the copolymer (B) may be prepared in the same way as the copolymer (A). The degree of swelling in electrolysis solution and the gel content of the copolymer (B) may be adjusted in the same way as the copolymer (A).

The second particulate binder needs to have a large degree of swelling in electrolysis solution of 250% by mass or more from the perspective of guaranteeing conductivity of lithium ions within the negative electrode mixed material layer formed using the slurry composition. When the degree of swelling in electrolysis solution deviates from the above range, conductivity of lithium ions within the negative electrode mixed material layer cannot be guaranteed, and electrical characteristics such as cycle characteristics worsen.

From the perspective of guaranteeing conductivity of lithium ions within the negative electrode mixed material layer by guaranteeing sufficient swelling upon contact with the electrolysis solution, and sufficiently improving the electrical characteristics such as cycle characteristics, the degree of swelling in electrolysis solution is preferably 300% by mass or more, more preferably 400% by mass or more, and even more preferably 500% by mass or more.

Furthermore, from the perspective of suppressing swelling of the negative electrode due to charging and discharging, and improving the electrical characteristics such as cycle characteristics, the second particulate binder is set to have a degree of swelling in electrolysis solution of 600% by mass or less, and a gel content of 70% by mass or more. If at least one of the degree of swelling in electrolysis solution and gel content deviates from the above ranges, swelling of the negative electrode cannot be suppressed even upon concomitant use of the first particulate binder, and the electrical characteristics of the lithium ion secondary battery worsen. From the perspective of guaranteeing close adherence between the negative electrode mixed material layer and the current collector, in the second particulate binder, the gel content is preferably 98% by mass or less. If the gel content deviates from the above range, the close adherence between the negative electrode mixed material layer and the current collector worsens, and the electrical characteristics such as cycle characteristics worsen.

From the perspective of sufficiently suppressing swelling of the negative electrode and improving the electrical characteristics, the degree of swelling in electrolysis solution is preferably 590% by mass or less, more preferably 570% by mass or less, and even more preferably 550% by mass or less. Furthermore, the gel content is preferably 75% by mass or more, more preferably 80% by mass or more, preferably 95% by mass or less, and more preferably 90% by mass or less.

The second particulate binder that has the above-described properties may be a particulate binder composed only of the copolymer (B), but the second particulate binder is preferably a particulate binder formed by a composite polymer composed of the copolymer (B) and one or more polymers other than the copolymer (B). The reason is that if the second particulate binder is a particulate binder formed by a composite polymer, it is possible to obtain a binder that combines the characteristics of each polymer. Hence, for example taking advantage of the presence of two polymer portions with different elasticity, the second particulate binder can be caused to conform well to the expansion and contraction of the negative electrode active material.

A composite polymer may be produced easily by a method (double-step polymerization method) to polymerize at least one type of monomer component according to a regular method and then polymerize at least one other type of monomer component according to a regular method. A particle of the composite polymer has a heterophase structure such that different polymer portions are present inside the particle.

In this context, a heterophase structure refers to a single particle formed by two or more different polymers being physically or chemically bonded, and not to a particle having a monophase structure formed by a single polymer such as a block polymer. Examples of the heterophase structure include a core-shell structure that is a spherical particle in which the center and the outer shell are formed from different polymers; a side-by-side structure in which two or more polymers are adjacent to each other; a snowman structure in which a portion of the polymer at the center in a core-shell structure is exposed from the outer shell; an octopus *ocellatus* structure in which a different type of polymer particle is embedded in the surface of a spherical polymer particle, yielding an integrated structure; and the like. A core-shell structure is preferable.

Specifically, the composite polymer used as the second particulate binder is, for example, prepared by polymerizing a monomer composition that includes at least an aliphatic conjugated diene monomer according to a regular method and then polymerizing the copolymer (B) according to a regular method. This approach yields a composite polymer having (i) a flexible polymer portion with low rigidity prepared using a monomer composition that includes at least an aliphatic conjugated diene monomer, and (ii) a portion formed by the copolymer (B), which is more rigid and has greater elasticity than the flexible polymer portion and includes an aliphatic conjugated diene monomer unit and an aromatic vinyl monomer unit. Accordingly, the flexible polymer portion with low rigidity can be used to conform well to the expansion and contraction of the negative electrode active material, while also using the portion formed by the copolymer (B) to control swelling of the negative electrode.

As the monomer composition that includes at least an aliphatic conjugated diene monomer, for example a composition that does not include an aromatic vinyl monomer, or a composition in which the content of an aromatic vinyl monomer is less than that of the monomer composition used in preparation of the copolymer (B), may be used.

As the aliphatic conjugated diene monomer, the same monomers as in the above-described copolymer (A) may be used.

Examples of a monomer blended into the monomer composition other than the aliphatic conjugated diene monomer include a vinyl cyanide monomer, and use of acrylonitrile is particularly preferable. As the vinyl cyanide monomer, it is possible to use the same monomer as the one that may be used in preparation of the copolymer (A).

When the second particulate binder is formed by the above-described composite polymer, or by a block polymer, the second particulate binder may have two or more glass transition temperatures. In this case, the second particulate binder preferably has at least one glass transition temperature within a range of −100° C. or higher to lower than 10° C. and at least one glass transition temperature within a range of 10° C. or higher to 100° C. or lower. If the second particulate binder has glass transition temperatures in the above two temperature ranges, the elasticity of the second particulate binder can be set to an appropriate level when used in the negative electrode for a lithium ion secondary battery, and while suppressing swelling of the negative electrode, close adherence between the negative electrode mixed material layer and the current collector can be guaranteed. As a result, the electrical characteristics of the lithium ion secondary battery can be improved when using a negative electrode formed with the slurry composition.

Note that when the second particulate binder is formed from a block polymer, the second particulate binder may be prepared using the preparation method for a known block polymer.

When the second particulate binder is formed by the above-described composite polymer, or by a block polymer, the degree of swelling in electrolysis solution, gel content, and glass transition temperature of the second particulate binder may be appropriately adjusted in a similar way as for the copolymer (A) by changing the preparation conditions of the polymer portions constituting the composite polymer (such as the monomer that is used, the polymerization conditions, and the like) and changing the preparation conditions of the block polymer (such as the monomer that is used, the polymerization conditions, and the like). Specifically, for example setting the ratio of the vinyl cyanide monomer unit in the copolymer (B) to be preferably 20% by mass or more to 50% by mass or less, more preferably 25% by mass or more to 45% by mass or less, and particularly preferably 30% by mass or more to 40% by mass or less allows for adjustment of the degree of swelling in electrolysis solution, gel content, and glass transition temperature of the second particulate binder.

In the disclosed slurry composition, the above-described first particulate binder and second particulate binder have a number average particle size of preferably 50 nm or more, more preferably 70 nm or more, preferably 500 nm or less, and more preferably 400 nm or less. Setting the number average particle size to be within the above range achieves good strength and flexibility for the resulting negative electrode. The number average particle size can be measured easily with a transmission electron microscope, a Coulter counter, laser diffraction scattering, or the like.

In the disclosed slurry composition, when the particulate binder is formed from the first particulate binder and the second particulate binder, the amount of the second particulate binder per 100 parts by mass (in terms of solid content) of the first particulate binder is, in terms of solid content, preferably set to 1 part by mass or more, more preferably to 5 parts by mass or more, even more preferably to 10 parts by mass or more, and particularly preferably to 15 parts by mass or more, and preferably set to 100 parts by mass or less, more preferably to 90 parts by mass or less, even more preferably to 70 parts by mass or less, still more preferably to 50 parts by mass or less, and particularly preferably to 30 parts by mass or less. If the amount of the second particulate binder per 100 parts by mass of the first particulate binder exceeds 100 parts by mass, the amount of the first particulate binder becomes too small. It may be the case that swelling of the negative electrode cannot be sufficiently suppressed, and electrical characteristics such as cycle characteristics may worsen. If the amount of the second particulate binder per 100 parts by mass of the first particulate binder is less than 1 part by mass, while the reason is unclear, it may be the case that swelling of the negative electrode cannot be sufficiently suppressed, and electrical characteristics such as cycle characteristics may worsen.

[Third Particulate Binder]

The disclosed slurry composition may include, as the particulate binder, a third particulate binder apart from the above-described first particulate binder and second particulate binder.

As the third particulate binder, any particulate binder that does not include the above-described copolymer (A) and copolymer (B) (i.e. a particulate binder that does not correspond to the first particulate binder or the second particulate binder) may be used. Among such particulate binders, a binder that includes a copolymer (C) including a (meth)acrylic acid ester monomer unit is preferable, and a binder composed of a copolymer (C) including a (meth)acrylic acid ester monomer unit is more preferable as the third particulate binder. The third particulate binder more preferably has a surface acid content of 0.01 mmol/g or more to 0.10 mmol/g or less.

As an example of the third particulate binder, the following describes a binder composed of a copolymer (C) that has a surface acid content of 0.01 mmol/g or more to 0.10 mmol/g or less and includes a (meth)acrylic acid ester monomer unit.

In the disclosed slurry composition, when using the third particulate binder composed of the copolymer (C) described in detail below, while the reason is unclear, the electrical characteristics of the lithium ion secondary battery such as the low temperature output characteristics can be improved.

The third particulate binder composed of the copolymer (C) has a surface acid content of 0.01 mmol/g or more to 0.10 mmol/g or less. The surface acid content of the third particulate binder is preferably 0.02 mmol/g or more and preferably 0.097 mmol/g or less.

In this disclosure, the "surface acid content" refers to the surface acid content per 1 g of solid content of the particulate binder and may be calculated with the following method.

First, a water dispersion including a particulate binder is prepared. The water dispersion including the particulate binder is inserted in a glass container cleaned with distilled water, an electrolytic-conductivity meter is set, and the water dispersion is stirred. The stirring is continued until the below-described addition of hydrochloric acid is complete.

A 0.1 normal sodium hydroxide aqueous solution is added to the water dispersion that includes the particulate binder so that the electrical conductivity of the water dispersion that includes the particulate binder becomes 2.5 mS to 3.0 mS. The electrical conductivity is then measured after six minutes elapse. The resulting value is taken to be the electrical conductivity at the start of measurement.

Next, 0.5 mL of 0.1 normal hydrochloric acid is added to the water dispersion that includes the particulate binder, and 30 seconds later, the electrical conductivity is measured. Subsequently, 0.5 mL of 0.1 normal hydrochloric acid is added again, and 30 seconds later, the electrical conductivity is measured. This operation is repeated in 30 second intervals until the electrical conductivity of the water dispersion that includes the particulate binder rises to or above the electrical conductivity at the start of measurement.

The resulting data on electrical conductivity are plotted on a graph with the electrical conductivity (units: mS) on the vertical axis (y-coordinate axis) and the total amount of added hydrochloric acid (units: mmol) on the horizontal axis (x-coordinate axis). In this way, an added amount of hydrochloric acid-electrical conductivity curve with three inflection points is obtained. The x-coordinates of the three inflection points and the x-coordinate when addition of hydrochloric acid was complete are labeled P1, P2, P3, and P4 in order from the smallest to the largest value. For the data in each of four sections, i.e. from the zero x-coordinate to the coordinate P1, from the coordinate P1 to the coordinate P2, from the coordinate P2 to the coordinate P3, and from the coordinate P3 to the coordinate P4, approximate lines L1, L2, L3, and L4 are calculated with the least square method. The x-coordinate of the intersection between the approximate line L1 and the approximate line L2 is defined as A1 (mmol), the x-coordinate of the intersection between the approximate line L2 and the approximate line L3 is defined as A2 (mmol), and x-coordinate of the intersection between the approximate line L3 and the approximate line L4 is defined as A3 (mmol).

The surface acid content per 1 g of the particulate binder is given by the value (mmol/g) converted to hydrochloric acid by Equation (a) below. The amount of acid in an aqueous phase per 1 g of the particulate binder (the amount of acid, per 1 g of solid content of the particulate binder, that is present in an aqueous phase in the water dispersion that includes the particulate binder; also referred to as the "amount of acid in an aqueous phase of the particulate binder") is given by the value (mmol/g) converted to hydrochloric acid by Equation (b) below. The total amount of acid per 1 g of particulate binder dispersed in water is the total of Equation (a) and Equation (b), as represented by Equation (c) below.

surface acid content per 1 g of particulate binder= $(A2-A1)$/solid content of particulate binder in water dispersion (a)

acid content in aqueous phase per 1 g of particulate binder=$(A3-A2)$/solid content of particulate binder in water dispersion (b)

total acid content per 1 g of particulate binder dispersed in water=$(A3-A1)$/solid content of particulate binder in water dispersion (c)

The surface acid content can be controlled by, for example, changing the type and ratio of the monomer used in preparation of the copolymer (C). A specific example of how to control the surface acid content is to use a monomer containing an acid group, such as an ethylenically unsaturated carboxylic acid monomer, to produce the copolymer (C). Normally, upon increasing the amount of the ethylenically unsaturated carboxylic acid monomer that is used, the proportion of ethylenically unsaturated carboxylic acid monomer unit in the copolymer (C) increases, thereby increasing the surface acid content.

Examples of the ethylenically unsaturated carboxylic acid monomer include an ethylenically unsaturated monocarboxylic acid monomer such as acrylic acid, methacrylic acid, or crotonic acid. Among these, acrylic acid and methacrylic acid are preferable. It is possible to use only one type of ethylenically unsaturated monocarboxylic acid monomer or to use two or more types in combination at any ratio.

The percentage of the ethylenically unsaturated carboxylic acid monomer unit in the copolymer (C) is preferably 0.1% by mass or more, more preferably 0.2% by mass or more, and particularly preferably 0.3% by mass or more. Furthermore, the percentage is preferably 10% by mass or less, more preferably 8% by mass or less, and particularly preferably 5% by mass or less.

The copolymer (C) includes a (meth)acrylic acid ester monomer unit. The (meth)acrylic acid ester monomer that can form the (meth)acrylic acid ester monomer unit of the copolymer (C) is not limited, and examples include acrylic acid alkyl esters, such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters, such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Among these, acrylic acid alkyl ester is preferable, and ethyl acrylate, n-butyl acrylate, and 2-ethylhexyl acrylate are more preferable. It is possible to use only one type of (meth)acrylic acid ester monomer alone, or to use two or more types in combination at any ratio.

The percentage of the (meth)acrylic acid ester monomer unit in the copolymer (C) is preferably 80% by mass or more, more preferably 85% by mass or more, preferably 99% by mass or less, and more preferably 98% by mass or less.

In addition to the above-described (meth)acrylic acid ester monomer unit and ethylenically unsaturated carboxylic acid monomer unit, the copolymer (C) may include a monomer unit containing a nitrile group, a cross-linkable monomer unit, or any other optional monomer unit.

Examples of a monomer containing a nitrile group that can form a monomer unit containing a nitrile group include unsaturated nitrile monomers, among which an $\alpha,\beta$-ethylenically unsaturated nitrile monomer is preferable. The carbon number of the monomer containing a nitrile group is preferably 3 or more to 18 or less. Examples of the monomer containing a nitrile group include acrylonitrile, methacrylonitrile, and $\alpha$-chloroacrylonitrile, among which acrylonitrile is preferable. It is possible to use only one type of monomer containing a nitrile group or to use two or more types in combination at any ratio.

The percentage of the monomer unit containing a nitrile group in the copolymer (C) is preferably 0.1% by mass or more, more preferably 0.2% by mass or more, preferably 10% by mass or less, and more preferably 5% by mass or less.

Examples of cross-linkable monomers that can be used to form the cross-linkable monomer unit typically include thermally cross-linkable monomers. In greater detail, examples of the cross-linkable monomer include a monofunctional monomer having a thermally cross-linkable group and one olefinic double bond per molecule, and a multifunctional monomer having two or more olefinic double bonds per molecule.

Examples of the thermally cross-linkable group include an epoxy group, N-methylol amide group, oxetanyl group, oxazoline group, and combinations thereof. Among these, an epoxy group is preferable for the ease with which its crosslink and crosslink density can be adjusted.

Examples of the cross-linkable monomer having an epoxy group as the thermally cross-linkable group and having an olefinic double bond include vinyl glycidyl ether, allyl glycidyl ether, butenyl glycidyl ether, o-allyl phenyl glycidyl ether, or other unsaturated glycidyl ether; butadiene monoepoxide, chloroprene monoepoxide, 4,5-epoxy-2-pentene, 3,4-epoxy-1-vinyl cyclohexene, 1,2-epoxy-5,9-cyclododecadiene, or other monoepoxide of diene or polyene; 3,4-epoxy-1-butene, 1,2-epoxy-5-hexene, 1,2-epoxy-9-decene, or other alkenyl epoxide; and also glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, glycidyl ester of 4-methyl-3-cyclohexenecarboxylic acid, or other glycidyl ester of unsaturated monocarboxylic acid; and the like.

Examples of the cross-linkable monomer having an N-methylol amide group as the thermally cross-linkable group and having an olefinic double bond include: (meth)acrylamides having a methylol group such as N-methylol (meth)acrylamide; and the like.

Examples of the cross-linkable monomer having an oxetanyl group as the thermally cross-linkable group and having an olefinic double bond include 3-[(meth)acryloyloxymethyl]oxetane, 3-[(meth)acryloyloxymethyl]-2-trifluoromethyloxetane, 3-[(meth)acryloyloxymethyl]-2-phenyloxetane, 2-[(meth)acryloyloxymethyl]oxetane, 2-[(meth)acryloyloxymethyl]-4-trifluoromethyloxetane, and the like.

Examples of the cross-linkable monomer having an oxazoline group as the thermally cross-linkable group and having an olefinic double bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, 2-isopropenyl-5-ethyl-2-oxazoline, and the like.

Examples of the multifunctional monomer having two or more olefinic double bonds include allyl(meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinylether, hydroquinone diallyl ether, tetraallyloxyethane, trimethylolpropane-diallyl ether, an allyl or vinyl ether of a multifunctional alcohol other than those listed above, triallylamine, methylene bisacrylamide, divinyl benzene, and the like.

Among these, as the cross-linkable monomer, a cross-linkable monomer having an epoxy group as the thermally cross-linkable group and having an olefinic double bond and a multifunctional monomer having two or more olefinic double bonds are preferable, and allyl methacrylate, ethylene dimethacrylate, allyl glycidyl ether, and glycidyl methacrylate are particularly preferable.

It is possible to use only one type of cross-linkable monomer or to use two or more types in combination at any ratio.

The percentage of the cross-linkable monomer unit in the copolymer (C) is preferably 0.1% by mass or more, more preferably 0.2% by mass or more, preferably 2% by mass or less, and more preferably 1.5% by mass or less.

Examples of optional monomer units include monomer units yielded by polymerizing any of the following monomers. It is possible to use only one type of optional monomer or to use two or more types in combination at any ratio.

Examples of the optional monomer include styrene, chlorostyrene, vinyl toluene, t-butylstyrene, vinylbenzoic acid methyl ester, vinyl naphthalene, chloromethylstyrene, hydroxymethylstyrene, α-methylstyrene, or other styrene-based monomer; vinyl sulfonic acid, styrene sulfonic acid, allyl sulfonic acid, sulfoethyl methacrylate, sulfopropyl methacrylate, sulfobutyl methacrylate, or other monomer containing a sulfonate group, and alkali metal salts thereof; a fluorine-containing (meth)acrylic acid ester monomer; and the like.

The percentage of the optional monomer unit in the copolymer (C) is preferably 0% by mass or more to 30% by mass or less and more preferably 0% by mass or more to 25% by mass or less.

The third particulate binder composed of the above-described copolymer (C) may, for example, be produced in the same way as the above-described copolymer (A) by polymerizing a monomer composition including a monomer in an aqueous solvent. The content percentage of each monomer in the monomer composition is usually the same as the content percentage of the repeating unit in the desired copolymer (C).

The glass transition temperature of the third particulate binder that includes the copolymer (C) is preferably −75° C. or more, more preferably −55° C. or more, and particularly preferably −38° C. or more, and is preferably 20° C. or less and more preferably 15° C. or less.

The gel content of the third particulate binder that includes the copolymer (C) is preferably 70% by mass or more to 98% by mass or less.

Furthermore, the degree of swelling in electrolysis solution of the third particulate binder that includes the copolymer (C) is preferably 250% by mass or more to 450% by mass or less.

The reason is that when the glass transition temperature is at least the above-mentioned lower limit, the gel content is at least the above-mentioned lower limit, and/or the degree of swelling in electrolysis solution is at most the above-mentioned upper limit, the swelling of the negative electrode due to charging and discharging can be suppressed and the electrical characteristics such as cycle characteristics can be sufficiently improved. Another reason is that when the glass transition temperature is at most the above-mentioned upper limit, it is possible to prevent the occurrence of the electrode plate becoming too firm and cracking during charging or discharging. Furthermore, another reason is that when the gel content is at most the above-mentioned upper limit, it is possible to guarantee close adherence between the negative electrode mixed material layer and the current collector and to suppress deterioration of the electrical characteristics such as cycle characteristics. Yet another reason is that when the degree of swelling in electrolysis solution is at least the above-mentioned lower limit, it is possible to guarantee conductivity of lithium ions within the negative electrode mixed material layer formed using the slurry composition and to sufficiently improve electrical characteristics such as cycle characteristics.

The degree of swelling in electrolysis solution, glass transition temperature, and gel content of the third particulate binder may be appropriately adjusted by changing the preparation conditions of the copolymer (C) (such as the monomer that is used, the polymerization conditions, and the like).

In the disclosed slurry composition, the above-described third particulate binder has a number average particle size of preferably 50 nm or more, more preferably 70 nm or more, preferably 500 nm or less, and more preferably 400 nm or less. The number average particle size can be measured easily with a transmission electron microscope, a Coulter counter, laser diffraction scattering, or the like.

In the disclosed slurry composition, when the particulate binder is formed from the first particulate binder, the second particulate binder, and the third particulate binder, the amount of the third particulate binder per 100 parts by mass (in terms of solid content) of the particulate binder is, in terms of solid content, preferably set to 5 parts by mass or more to 30 parts by mass or less. The reason is that by setting the amount of the third particulate binder to be 5 parts by mass or more per 100 parts by mass of the particulate binder, the electrical characteristics of the lithium ion secondary battery, such as low temperature output characteristics, can be sufficiently improved. On the other hand, the reason for setting the amount of the third particulate binder to be 30 parts by mass or less per 100 parts by mass of the particulate binder is that the proportion of the first particulate binder and the second particulate binder in the particulate binder can be guaranteed, so that suppression of swelling of the negative electrode due to charging and discharging and an improvement in electrical characteristics of the lithium ion secondary battery can be achieved with the first particulate binder and the second particulate binder.

When the particulate binder is formed from the first particulate binder, the second particulate binder, and the third particulate binder, the ratio of the particulate binders is, in terms of solid content, preferably in the ranges of first particulate binder:second particulate binder:third particulate binder=25-80:10-70:5-30. Setting the ratio of the particulate binders to be within the above ranges allows for suppression of swelling due to charging and discharging and an improvement in the electrical characteristics of the lithium ion secondary battery, while also improving the low temperature output characteristics of the lithium ion secondary battery.

In the disclosed slurry composition, the content of the particulate binder that includes the first particulate binder, the second particulate binder, and optionally the third particulate binder is, per 100 parts by mass of the negative electrode active material, preferably 0.5 parts by mass or more, more preferably 0.8 parts by mass or more, preferably 10 parts by mass or less, and more preferably 3 parts by mass or less. By setting the content of the particulate binder per 100 parts by mass of the negative electrode active material to be 0.5 parts by mass or more, the close adherence between the negative electrode mixed material layer and the current collector can be sufficiently guaranteed. Furthermore, by setting the content of the particulate binder to be 10 parts by mass or less, it is possible to suppress an increase in internal resistance of the lithium ion secondary battery that uses a negative electrode formed with the slurry composition and to improve the electrical characteristics of the lithium ion secondary battery.

<Water Soluble Polymer>

When a negative electrode is formed using the slurry composition, the water soluble polymer undergoes elastic deformation in conformity with expansion or contraction of the negative electrode active material and suppresses swelling of the negative electrode due to charging and discharging. The water soluble polymer can also function as a viscosity modification solvent that modifies the viscosity of the slurry composition and allows for the slurry composition to be applied easily onto the current collector.

Stating that a polymer is water soluble refers to an insoluble portion being less than 10% by mass when 0.5 g of polymer is dissolved in 100 g of water at 25° C. The insoluble portion is preferably less than 0.5% by mass.

The water soluble polymer is not limited, and examples thereof include a cellulosic polymer, a polymer including a monomer unit containing an acid group, and a mixture thereof.

Examples of the cellulosic polymer include carboxymethyl cellulose, hydroxyethyl cellulose, and hydroxypropyl cellulose. Among these, carboxymethyl cellulose is preferable from the perspective of increasing stability of the slurry composition.

Examples of a polymer including a monomer unit containing an acid group include a sulfonic acid polymer such as polystyrene sulfonic acid, and a polymer that includes an ethylenically unsaturated carboxylic acid monomer unit, (meth)acrylic acid ester monomer unit, and fluorine-containing (meth)acrylic acid ester monomer unit.

In this disclosure, "(meth)acrylic acid" refers to acrylic acid and/or methacrylic acid. Furthermore, a (meth)acrylic acid ester monomer that contains fluorine is distinguished from other (meth)acrylic acid ester monomer as a fluorine-containing (meth)acrylic acid ester monomer.

Examples of an ethylenically unsaturated carboxylic acid monomer that can form the ethylenically unsaturated carboxylic acid monomer unit include an ethylenically unsaturated monocarboxylic acid and derivatives thereof and an ethylenically unsaturated dicarboxylic acid, an acid anhydride thereof, and derivatives thereof. Examples of the ethylenically unsaturated monocarboxylic acid include acrylic acid, methacrylic acid, and crotonic acid. Examples of derivatives of the ethylenically unsaturated monocarboxylic acid include 2-ethylacrylic acid, isocrotonic acid, α-acetoxyacrylic acid, β-trans-aryloxyacrylic acid, α-chloro-β-E-methoxyacrylic acid, β-diaminoacrylic acid, and the like. Examples of the ethylenically unsaturated dicarboxylic acid include maleic acid, fumaric acid, itaconic acid, and the like. Examples of acid anhydrides of the ethylenically unsaturated dicarboxylic acid include maleic anhydride, acrylic anhydride, methylmaleic anhydride, dimethylmaleic anhydride, and the like. Examples of derivatives of the ethylenically unsaturated dicarboxylic acid include methylmaleic acid, dimethylmaleic acid, phenylmaleic acid, chloromaleic acid, dichloromaleic acid, fluoromaleic acid, maleic acid methylallyl; and diphenyl maleate, nonyl maleate, decyl maleate, dodecyl maleate, octadecyl maleate, fluoroalkyl maleate, or other maleic acid ester. Among these, an ethylenically unsaturated monocarboxylic acid such as acrylic acid, methacrylic acid, and the like is preferable. The reason is that the dispersiveness in water of the resulting polymer is further increased.

It is possible to use only one type of ethylenically unsaturated carboxylic acid monomer or to use two or more types in combination at any ratio.

The content percentage of the ethylenically unsaturated carboxylic acid monomer unit is preferably 15% by mass or more, more preferably 20% by mass or more, and particularly preferably 25% by mass or more. Furthermore, the content is preferably 50% by mass or less, more preferably 45% by mass or less, and particularly preferably 40% by mass or less. Setting the amount of the ethylenically unsaturated carboxylic acid monomer unit to 15% by mass or more increases adhesiveness of the polymer to the negative electrode active material, increases dispersiveness of the negative electrode active material, and increases close adherence with the current collector. Setting the amount to 50% by mass or less increases the flexibility of the polymer, thereby enhancing flexibility of the negative electrode, preventing the negative electrode from chipping or cracking, and enhancing durability.

Examples of the (meth)acrylic acid ester monomer that can form the (meth)acrylic acid ester monomer unit include acrylic acid alkyl esters, such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters, such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

It is possible to use only one type of (meth)acrylic acid ester monomer alone, or to use two or more types in combination at any ratio.

The content percentage of the (meth)acrylic acid ester monomer unit is preferably 30% by mass or more, more preferably 35% by mass or more, particularly preferably 40% by mass or more, and preferably 70% by mass or less. Setting the content percentage of the (meth)acrylic acid ester monomer unit to be 30% by mass or more increases the close adherence to the current collector of the negative electrode active material, and setting the content percentage to be 70% by mass or less increases flexibility of the negative electrode.

Examples of the fluorine-containing (meth)acrylic acid ester monomer that can form the fluorine-containing (meth)acrylic acid ester monomer unit include monomers represented by the formula below:

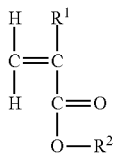

where $R^1$ represents a hydrogen atom or a methyl group, and $R^2$ represents a hydrocarbon group containing a fluorine atom. The carbon number of the hydrocarbon group is normally one or more and normally 18 or less. The number of fluorine atoms contained in $R^2$ may be one, or the number may be two or more.

Examples of the fluorine-containing (meth)acrylic acid ester monomer represented by the above formula include (meth)acrylic acid alkyl fluoride ester, (meth)acrylic acid aryl fluoride ester, and (meth)acrylic acid aralkyl fluoride ester. Among these, (meth)acrylic acid alkyl fluoride ester is preferable. Examples of such monomers include (meth)acrylic acid perfluoroalkyl esters such as (meth)acrylic acid trifluoromethyl ester, (meth)acrylic acid 2,2,2-trifluoroethyl ester, (meth)acrylic acid β-(perfluorooctyl)ethyl ester, (meth)acrylic acid 2,2,3,3-tetrafluoropropyl ester, (meth)acrylic acid 2,2,3,4,4,4-hexafluorobutyl ester, (meth)acrylic acid 1H,1H,9H-perfluoro-1-nonyl ester, (meth)acrylic acid 1H,1H,11H-perfluoroundecyl ester, (meth)acrylic acid perfluorooctyl ester, and (meth)acrylic acid 3(4 {1-trifluoromethyl-2,2-bis [bis(trifluoromethyl)fluoromethyl]ethynyloxy} benzooxy)2-hydroxypropyl ester, and the like.

It is possible to use only one type of fluorine-containing (meth)acrylic acid ester monomer alone, or to use two or more types in combination at any ratio.

The content percentage of the fluorine-containing (meth)acrylic acid ester monomer unit is preferably 0.5% by mass or more, more preferably 1% by mass or more, preferably 10% by mass or less, and more preferably 5% by mass or less. Setting the content percentage of the fluorine-containing (meth)acrylic acid ester monomer unit to be 0.5% by mass or more improves the low temperature output characteristics of a secondary battery. Setting the content percentage to be 10% by mass or less prevents the polymer from becoming excessively soft, which would lower durability of the negative electrode.

As long as the disclosed effects are not significantly impaired, a polymer that includes an ethylenically unsaturated carboxylic acid monomer unit, (meth)acrylic acid ester monomer unit, and fluorine-containing (meth)acrylic acid ester monomer unit may also include a repeating unit other than the above-described ethylenically unsaturated carboxylic acid monomer unit, (meth)acrylic acid ester monomer unit, and fluorine-containing (meth)acrylic acid ester monomer unit. Such a monomer that can form the repeating unit is a monomer that can copolymerize with an ethylenically unsaturated carboxylic acid monomer, a (meth)acrylic acid ester monomer, or a fluorine-containing (meth)acrylic acid ester monomer.

Examples of such a copolymerizable monomer include a carboxylic acid ester monomer having two or more carbon-carbon double bonds such as ethylene glycol dimethacrylate, diethylene glycol dimethacrylate, and trimethylolpropane triacrylate; styrene, chlorostyrene, vinyl toluene, t-butylstyrene, vinylbenzoic acid, vinylbenzoic acid methyl ester, vinylnaphthalene, chloromethylstyrene, hydroxymethylstyrene, α-methylstyrene, divinyl benzene, or other styrene-based monomer; acrylamide, N-methylolacrylamide, acrylamide-2-methylpropane sulfonic acid, or other amide-based monomer; acrylonitrile, methacrylonitrile, or other vinyl cyanide-based monomer; ethylene, propylene, or other olefin-type monomer; vinyl chloride, vinylidene chloride, or other halogen atom-containing monomer; vinyl acetate, vinyl propionate, vinyl butyrate, vinyl benzoate, or other vinyl ester-type monomer; methyl vinyl ether, ethyl vinyl ether, butyl vinyl ether, or other vinyl ether-type monomer; methyl vinyl ketone, ethyl vinyl ketone, butyl vinyl ketone, hexyl vinyl ketone, isopropenyl vinyl ketone, or other vinyl ketone-type monomer; and N-vinylpyrrolidone, vinylpyridine, vinylimidazole, or other heterocycle-containing vinyl compound monomer.

It is possible to use only one of the above copolymerizable monomers alone, or to use two or more types in combination at any ratio.

The content percentage of the repeating unit other than the above-described ethylenically unsaturated carboxylic acid monomer unit, (meth)acrylic acid ester monomer unit, and fluorine-containing (meth)acrylic acid ester monomer unit is preferably 0% by mass or more to 10% by mass or less and more preferably 0% by mass or more to 5% by mass or less.

As a method of producing a polymer that includes an ethylenically unsaturated carboxylic acid monomer unit, (meth)acrylic acid ester monomer unit, and fluorine-containing (meth)acrylic acid ester monomer unit, for example a monomer composition that includes the above-described ethylenically unsaturated carboxylic acid monomer, (meth)acrylic acid ester monomer, and fluorine-containing (meth)acrylic acid ester monomer may be polymerized in an aqueous solvent. The aqueous solvent and the polymerization method may, for example, be similar to those used in production of the copolymer (A). An aqueous solution in which the polymer is normally dissolved in an aqueous solvent is thus obtained. The polymer may be extracted from the aqueous solution obtained in this way, but normally, a slurry composition is produced using the polymer in a state of being dissolved in the aqueous solvent, and the slurry composition is used to produce a negative electrode.

Since the above aqueous solution that includes the above polymer in an aqueous solvent is normally acidic, the aqueous solution may be alkalized as necessary to between pH 7 and pH 13. Handleability of the aqueous solution can thus be improved, and coatability of the slurry composition can also be improved. Examples of the method of alkalizing to between pH 7 and pH 13 include mixing with an aqueous alkaline solution (for example, an aqueous alkali metal solution such as an aqueous lithium hydroxide solution, an aqueous sodium hydroxide solution, or an aqueous potassium hydroxide solution; an aqueous alkaline earth metal solution such as an aqueous calcium hydroxide solution or an aqueous magnesium hydroxide solution; or an aqueous ammonia solution). It is possible to use only one of the above aqueous alkaline solutions alone, or to use two or more types in combination at any ratio.

The content of the water soluble polymer, such as the above-described cellulosic polymer, the polymer including a monomer unit containing an acid group, or the like, in the slurry composition per 100 parts by mass of the negative electrode active material is preferably 0.05 parts by mass or more, more preferably 0.08 parts by mass or more, preferably 10 parts by mass or less, and more preferably 3 parts by mass or less. The reason is that setting the content of the water soluble polymer to be 0.05 parts by mass or more per 100 parts by mass of the negative electrode active material sufficiently suppresses swelling of the negative electrode while improving close adherence between the negative electrode mixed material layer and the current collector. Furthermore, by setting the content of the water soluble polymer to be 10 parts by mass or less per 100 parts by mass of the negative electrode active material, it is possible to suppress an increase in internal resistance of the lithium ion secondary battery that uses a negative electrode formed with the slurry composition and to improve the electrical characteristics of the lithium ion secondary battery.

<Other Components>

Other than the above components, the disclosed slurry composition may include components such as a conductive agent, a reinforcing agent, a leveling agent, an electrolysis solution additive, or the like. These optional components are not limited so long as they do not affect the battery reaction and may be selected from well-known components, such as those described in WO2012/115096. It is possible to use only one of these components alone, or to use two or more types in combination at any ratio.

<Preparation of Slurry Composition>

The slurry composition of the disclosure can be prepared by dispersing the above-described components in a dispersion medium, or specifically in an aqueous medium. Specifically, the slurry composition can be prepared by mixing the above-described components and the aqueous medium with the use of a mixer such as a ball mill, a sand mill, a bead mill, a pigment disperser, a grinding machine, an ultrasonic disperser, a homogenizer, a planetary mixer, and FILMIX. The particulate binder may be added in the form of an aqueous dispersion.

Typically, the aqueous medium used is water; however, an aqueous solution of any compound or a mixed solution of a small amount of organic medium and water may also be used. The solid content concentration of the slurry composition is a concentration that allows for uniform dispersion of each component, for example 30% by mass or more to 90% by mass or less, preferably 40% by mass or more to 80% by mass or less. Mixing of the above-described components with the aqueous medium may be typically performed at a temperature ranging from room temperature to 80° C. for 10 minutes to several hours.

(Negative Electrode for Lithium Ion Secondary Battery)

The disclosed negative electrode for a lithium ion secondary battery may be produced using the disclosed slurry composition.

The disclosed negative electrode for a lithium ion secondary battery includes a current collector and a negative electrode mixed material layer formed on the current collector. The negative electrode mixed material layer includes at least a negative electrode active material, a particulate binder including the first particulate binder and the second particulate binder, and a water soluble polymer. The negative electrode active material, particulate binder, and water soluble polymer included in the negative electrode are included in the disclosed slurry composition, and the suitable ratio by which these components are present in the negative electrode is the same as the suitable ratio by which these components are present in the disclosed slurry composition.

In the disclosed negative electrode for a lithium ion secondary battery, the negative electrode mixed material layer includes the water soluble polymer and the particulate binder including the first particulate binder and the second particulate binder, thereby suppressing swelling due to charging and discharging and also improving the electrical characteristics of the lithium ion secondary battery, such as charge acceptance and cycle characteristics.

The disclosed negative electrode for a lithium ion secondary battery may be produced by applying the above-described slurry composition for a negative electrode for a lithium ion secondary battery onto a current collector (application step) and drying the slurry composition for a negative electrode for a lithium ion secondary battery applied onto the current collector to form a negative electrode mixed material layer on the current collector (drying step).

[Application Step]

The above-described slurry composition for a negative electrode for a lithium ion secondary battery may be applied onto the current collector with any publicly-known method. Specifically, the slurry composition may be applied for example by doctor blading, dip coating, reverse roll coating, direct roll coating, gravure coating, extrusion coating, or brush coating. The slurry composition may be applied onto one side or both sides of the current collector. The thickness of the slurry coating applied onto the current collector before drying may be properly determined in accordance with the thickness of the negative electrode mixed material layer to be obtained after drying.

The current collector to be coated with the slurry composition is made of a material having electrical conductivity and electrochemical durability. Specifically, a current collector formed from iron, copper, aluminum, nickel, stainless steel, titanium, tantalum, gold, platinum, or the like, for example, may be used as the current collector. Among these, copper foil is particularly preferable as the current collector used in the negative electrode. It is possible to use only one of the above materials alone, or to use two or more types in combination at any ratio.

[Drying Step]

The slurry composition applied on the current collector may be dried by any publicly-known method, for example, drying by warm, hot, or low-humidity air; drying in a vacuum; or drying by irradiation of infrared light or electron beams. Drying the slurry composition on the current collector forms a negative electrode mixed material layer on the current collector, thus yielding the negative electrode for a lithium ion secondary battery that includes the current collector and the negative electrode mixed material layer.

After the drying step, the negative electrode mixed material layer may be further subjected to a pressing treatment, such as mold pressing or roll pressing. The pressing treatment increases the close adherence between the negative electrode mixed material layer and the current collector.

Furthermore, when the negative electrode mixed material layer includes a curable polymer, the polymer is preferably cured after forming the negative electrode mixed material layer.

(Lithium Ion Secondary Battery)

The disclosed lithium ion secondary battery includes a positive electrode, a negative electrode, an electrolysis solution, and a separator, and the disclosed negative electrode for a lithium ion secondary battery is used as the negative electrode. Since the disclosed lithium ion secondary battery uses the disclosed negative electrode for a lithium ion secondary battery, it is possible to suppress swelling of the negative electrode due to repeated charging and discharging, while also attaining excellent electrical characteristics.

<Positive Electrode>

The positive electrode of the lithium ion secondary battery may be any known positive electrode that is used as the positive electrode for a lithium ion secondary battery. Specifically, a positive electrode obtained by forming a positive electrode mixed material layer on a current collector, for example, may be used as the positive electrode.

The current collector may be made of a metal material such as aluminum. The positive electrode mixed material layer may be a layer including a known positive electrode active material, a conductive material, and a binder.

<Electrolysis Solution>

The electrolysis solution may be formed by dissolving an electrolyte in a solvent.

The solvent may be an organic solvent that can dissolve an electrolyte. Specifically, the solvent may be an alkyl carbonate solvent to which a viscosity modification solvent is added. Examples of the alkyl carbonate solvent include ethylene carbonate, propylene carbonate, and γ-butyrolactone. Examples of the viscosity modification solvent include 2,5-dimethyltetrahydrofuran, tetrahydrofuran, diethyl carbonate, ethylmethyl carbonate, dimethyl carbonate, methyl acetate, dimethoxyethane, dioxolane, methyl propionate, and methyl formate.

The electrolyte may be a lithium salt. Examples of the lithium salt that may be used include those described in JP2012-204303A. Of the lithium salts, $LiPF_6$, $LiClO_4$, and $CF_3SO_3Li$ are preferred as electrolytes because they readily dissolve in organic solvents and exhibit a high degree of dissociation.

<Separator>

Examples of the separator that may be used in the disclosed embodiments include those described in JP2012-204303A. Of these separators, a fine porous membrane made of polyolefinic resin (i.e., polyethylene, polypropylene, polybutene, and polyvinyl chloride) is preferred, because such a membrane can reduce the total thickness of the separator, which increases the ratio of the electrode active material in the secondary battery, consequently increasing the capacity per volume.

<Method of Producing Lithium Ion Secondary Battery>

The lithium ion secondary battery of the disclosure is produced for example by layering a positive electrode and a negative electrode by interposing a separator therebetween, rolling or folding the resulting laminate as necessary in accordance with the battery shape, placing it in a battery container, filling the battery container with an electrolysis solution, and sealing the container. To prevent pressure increase inside the lithium ion secondary battery and occurrence of overcharge/overdischarge and the like, the lithium ion secondary battery may include an overcurrent preventing device such as a fuse and a PTC device, expanded metal, and a lead plate. The secondary battery may take any shape such as a coin, a button, a sheet, a cylinder, a square, and a plane.

EXAMPLES

The following describes the disclosed products in detail based on Examples, yet this disclosure is not limited to these Examples. In the following, "%" and "parts" used in expressing quantities are by mass, unless otherwise indicated. In the Examples and Comparative Examples, the degree of swelling in electrolysis solution, glass transition temperature, gel content, and surface acid content of the particulate binder, and the initial swelling, initial cycle characteristics, cycle characteristics, post-cycle swelling, rate characteristics, and low temperature rate characteristics of the lithium ion secondary battery were evaluated with the following methods.

<Degree of Swelling in Electrolysis Solution>

An aqueous dispersion including a particulate binder was prepared, and a film with a thickness of 3±0.3 mm was formed by drying the aqueous dispersion for three days in an environment of 50% humidity and a temperature of 23° C. to 25° C. The formed film was cut to a diameter of 12 mm and precisely weighed.

The mass of the film fragment obtained by cutting the film was designated as W0. This film fragment was caused to swell by immersion for 72 hours, in an environment at 60° C., in 50 g of electrolysis solution (composition: concentration 1.0 M $LiPF_6$ solution (where the solvent was a mixed solvent of ethylene carbonate/ethylmethyl carbonate=3/7 (volume ratio), with the addition of 2% by mass (solvent ratio) of vinylene carbonate as an additive)). Subsequently, the film fragment (after swelling) was removed from the electrolysis solution and gently wiped, and the mass W1 was measured.

The degree of swelling (% by mass) was calculated with the following formula.

$$\text{degree of swelling (\% by mass)} = (W1/W0) \times 100$$

<Glass Transition Temperature>

An aqueous dispersion including a particulate binder was prepared, and a film was obtained by drying the aqueous dispersion for three days in an environment of 50% humidity and a temperature of 23° C. to 25° C. After drying the film in a hot air oven at 120° C. for one hour, a strip with a thickness of 1.0±0.1 mm, length of 50±2 mm, and width of 5±0.1 mm was cut out and used as a test piece for measuring dynamic viscoelasticity.

The viscoelasticity spectrometer (DMS) EXSTAR DMS5800 (produced by Seiko Instruments Inc.) was used as a device for measuring dynamic viscoelasticity, and the storage elastic modulus, loss elastic modulus, and tan δ were measured under the conditions of deformation mode: stretching; frequency: 1 Hz; measurement temperature: −100° C. to 180° C.; and rate of temperature increase: 3° C. per minute.

The temperature of the peak of the resulting tan δ was defined as the glass transition temperature.

<Gel Content>

An aqueous dispersion including a particulate binder was prepared, and a film with a thickness of 3±0.3 mm was formed by drying the aqueous dispersion in an environment of 50% humidity and a temperature of 23° C. to 25° C. The formed film was cut at a 1 mm angle, and approximately 1 g was weighed.

The mass of the film fragment obtained by cutting the film was designated as w0. This film fragment was immersed in 100 g of tetrahydrofuran (THF) for 24 hours at 25° C. Subsequently, the film fragment was removed from the THF and vacuum dried for three hours at 105° C., and the mass w1 of the insoluble portion was measured.

The gel content (% by mass) was calculated with the following formula.

$$\text{gel content (\% by mass)} = (w1/w0) \times 100$$

<Surface Acid Content>

First, a water dispersion including a particulate binder (solid content concentration: 2% by mass) was prepared. 50 g of the water dispersion including the particulate binder was inserted in a 150 mL glass container cleaned with distilled water, an electrolytic-conductivity meter was set, and the water dispersion was stirred. The stirring was continued until the below-described addition of hydrochloric acid was complete.

A 0.1 normal sodium hydroxide aqueous solution was added to the water dispersion that includes the particulate binder so that the electrical conductivity of the water dispersion that includes the particulate binder became 2.5 mS to 3.0 mS. The electrical conductivity was then measured after six minutes elapsed. The resulting value was taken to be the electrical conductivity at the start of measurement.

Next, 0.5 mL of 0.1 normal hydrochloric acid was added to the water dispersion that includes the particulate binder, and 30 seconds later, the electrical conductivity was measured. Subsequently, 0.5 mL of 0.1 normal hydrochloric acid was added again, and 30 seconds later, the electrical conductivity was measured. This operation was repeated in 30 second intervals until the electrical conductivity of the water dispersion that includes the particulate binder rose to or above the electrical conductivity at the start of measurement.

The resulting data on electrical conductivity were plotted on a graph with the electrical conductivity (units: mS) on the vertical axis (y-coordinate axis) and the total amount of added hydrochloric acid (units: mmol) on the horizontal axis (x-coordinate axis). In this way, an added amount of hydrochloric acid-electrical conductivity curve with three inflection points was obtained. The x-coordinates of the three inflection points were labeled P1, P2, and P3 in order from the smallest to the largest value. For the data in each of three sections, i.e. from the zero x-coordinate to the coordinate P1, from the coordinate P1 to the coordinate P2, and from the coordinate P2 to the coordinate P3, approximate lines L1, L2, and L3 were calculated with the least square method. The x-coordinate of the intersection between the approximate line L1 and the approximate line L2 was defined as A1 (mmol), and the x-coordinate of the intersection between the approximate line L2 and the approximate line L3 was defined as A2 (mmol).

The surface acid content per 1 g of the particulate binder was given by the value (mmol/g) converted to hydrochloric acid by the equation below.

$$\text{surface acid content per 1 g of particulate binder} = A2 - A1$$

<Initial Swelling>

The laminated cell-type lithium ion secondary battery that was produced was left standing for five hours in an environment at 25° C. and then charged in an environment at 25° C. at a rate of 4.2 V, 1 C.

Subsequently, the cell in a charged state was disassembled and the negative electrode removed. The thickness (d1) of the negative electrode (excluding the thickness of the current collector) was then measured. The rate of change with respect to the thickness (d0) of the negative electrode (excluding the thickness of the current collector) before production of the lithium ion secondary battery was then calculated (initial swelling property=((d1−d0)/d0)×100(%)) and evaluated according to the following standard. A smaller value for the initial swelling property indicates less initial swelling of the negative electrode.

A: initial swelling property of less than 30%
B: initial swelling property of 30% or more to less than 35%
C: initial swelling property of 35% or more to less than 40%
D: initial swelling property of 40% or more <Initial Cycle Characteristics>

The laminated cell-type lithium ion secondary battery that was produced was left standing for five hours in an environment at 25° C. and then charged and discharged in an environment at 25° C. at a charge rate of 4.2 V, 1 C and a discharge rate of 3.0 V, 1 C to measure the initial capacity C0. Furthermore, similar charging and discharging were repeated in an environment at 45° C. to measure the capacity C2 after 20 cycles.

The initial cycle characteristics were calculated as a rate of change in capacity $\Delta CC$ as indicated by $\Delta CC=(C2/C0)\times 100(\%)$ and evaluated according to the following standard. A higher value for the rate of change in capacity $\Delta CC$ indicates better initial cycle characteristics.

A: $\Delta CC$ of 93% or more
B: $\Delta CC$ of 88% or more to less than 93%
C: $\Delta CC$ of 83% or more to less than 88%
D: $\Delta CC$ of less than 83%

<Cycle Characteristics>

The laminated cell-type lithium ion secondary battery that was produced was left standing for five hours in an environment at 25° C. and then charged and discharged in an environment at 25° C. at a charge rate of 4.2 V, 1 C and a discharge rate of 3.0 V, 1 C to measure the initial capacity C0. Furthermore, similar charging and discharging were repeated in an environment at 45° C. to measure the capacity C3 after 100 cycles.

The cycle characteristics were calculated as a rate of change in capacity $\Delta C$ as indicated by $\Delta C=(C3/C0)\times 100(\%)$ and evaluated according to the following standard. A higher value for the rate of change in capacity $\Delta C$ indicates better cycle characteristics.

A: $\Delta C$ of 86% or more
B: $\Delta C$ of 80% or more to less than 86%
C: $\Delta C$ of 75% or more to less than 80%
D: $\Delta C$ of less than 75%

<Post-Cycle Swelling>

The laminated cell-type lithium ion secondary battery that was produced was left standing for five hours in an environment at 25° C. and then subjected to 100 cycles of charging and discharging in an environment at 45° C. at a charge/discharge rate of 4.2 V, 1 C.

After completion of 100 cycles, the cell was charged in an environment at 25° C. at 1 C. The cell in a charged state was disassembled and the negative electrode removed. The thickness (d2) of the negative electrode (excluding the thickness of the current collector) was then measured. The rate of change with respect to the thickness (d0) of the negative electrode (excluding the thickness of the current collector) before production of the lithium ion secondary battery was then calculated (post-cycle swelling property= ((d2−d0)/d0)×100(%)) and evaluated according to the following standard. A smaller value for the post-cycle swelling property indicates less post-cycle swelling of the negative electrode.

A: post-cycle swelling property of less than 35%
B: post-cycle swelling property of 35% or more to less than 40%
C: post-cycle swelling property of 40% or more to less than 45%
D: post-cycle swelling property of 45% or more <Rate Characteristics>

The laminated cell-type lithium ion secondary battery that was produced was left standing for five hours in an environment at 25° C., then charged in an environment at 25° C. at a rate of 4.2 V, 0.2 C and discharged at rates of 0.2 C and 1.5 C. At this time, the discharge capacities at the discharge rates were defined as $C_{0.2}$ (discharge capacity at the time of 0.2 C) and $C_{1.5}$ (discharge capacity at the time of 1.5 C). The discharge rate characteristics (=($C_{1.5}/C_{0.2}$)×100(%)) were then calculated and evaluated according to the following standard.

A: discharge rate characteristics of 80% or more
B: discharge rate characteristics of 75% or more to less than 80%
C: discharge rate characteristics of 70% or more to less than 75%
D: discharge rate characteristics of less than 70%

<Low Temperature Rate Characteristics>

The laminated cell-type lithium ion secondary battery that was produced was left standing for 24 hours in an environment at 25° C., then charged in an environment at 25° C. for five hours at a constant current of 0.1 C. After charging the voltage V0 was measured. Subsequently, in an environment at −30° C., the cell was discharged at a discharge rate of 0.5 C, and the voltage V1 at 15 seconds after the start of discharging was measured. The change in voltage ΔV indicated by ΔV=V0−V1 was then calculated and evaluated according to the following standard. A smaller value for the change in voltage ΔV indicates better low temperature rate characteristics.

A: change in voltage ΔV of less than 1.0 V
B: change in voltage ΔV of 1.0 V or more Example 1

<Preparation of Negative Electrode Active Material A>

Using a bead mill, 100 parts of silicon monoxide (produced by OSAKA Titanium Technologies Co., Ltd.) and 20 parts of polyvinyl alcohol (reagent grade, produced by Tokyo Chemical Industry Co., Ltd.) were wet-milled to coat the surface of silicon monoxide particles. Subsequently, after drying the mixture into cake form in a nitrogen atmosphere, heat treatment was applied at 950° C. in an argon atmosphere to yield a complex compound such that $SiO_x$ was dispersed into the matrix of conductive carbon (carbon coated $SiO_x$). The resulting carbon-coated $SiO_x$ was then classified to produce silicon-based negative electrode active material A composed of carbon-coated $SiO_x$ (x=1.1) of less than 325 mesh.

95 parts of artificial graphite (specific surface area: 4 $m^2$/g, volume average particle size: 24.5 μm) as carbon-based negative electrode active material and 5 parts of the silicon-based negative electrode active material A were then mixed with a dry powder mixer to yield the negative electrode active material A.

<Preparation of Particulate Binder>
[Preparation of First Particulate Binder A]

Into a 5 MPa pressure tight container with an agitator, 65 parts of styrene as an aromatic vinyl monomer, 35 parts of 1,3-butadiene as an aliphatic conjugated diene monomer, 4 parts of itaconic acid as an ethylenically unsaturated carboxylic acid monomer, 1 part of 2-hydroxyethyl acrylate as an unsaturated monomer having a hydroxyalkyl group, 0.3 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator were injected and thoroughly stirred. The result was then heated to 55° C. to begin polymerization. When the amount of monomer consumed reached 95.0%, the mixture was cooled to stop the reaction.

A 5% sodium hydroxide aqueous solution was added to the resulting aqueous dispersion including a copolymer for adjustment to pH 8. Subsequently, the unreacted monomer was removed by distillation under heating and reduced pressure. The result was then cooled to 30° C. or less to obtain an aqueous dispersion including a styrene-butadiene copolymer (aqueous dispersion of the first particulate binder A). The degree of swelling in electrolysis solution, glass transition temperature, and gel content of the first particulate binder A were then measured with the above-described methods. Table 1 lists the results.

[Preparation of Second Particulate Binder A]

Into a 5 MPa pressure tight container with an agitator, 35 parts of acrylonitrile as a vinyl cyanide monomer, 65 parts of 1,3-butadiene as an aliphatic conjugated diene monomer, 0.3 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator were injected and thoroughly stirred. The result was then heated to 55° C. to begin polymerization of the first polymer component. Once the amount of monomer consumed reached 80.0%, an aqueous dispersion formed by premixing 27 parts of styrene as an aromatic vinyl monomer, 15 parts of 1,3-butadiene as an aliphatic conjugated diene monomer, 16 parts of acrylonitrile as a vinyl cyanide monomer, 1 part of acrylic acid and 2 parts of itaconic acid as an ethylenically unsaturated carboxylic acid monomer, 0.2 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator was further injected. The second polymer component was then polymerized, and the mixture was cooled to stop the reaction at the point the consumed amount of all injected monomers reached 95.0%. A 5% sodium hydroxide aqueous solution was added to the resulting aqueous dispersion including a polymer (composite polymer) for adjustment to pH 8. Subsequently, the unreacted monomer was removed by distillation under heating and reduced pressure. The result was then cooled to 30° C. or less to obtain an aqueous dispersion including a composite polymer (aqueous dispersion of the second particulate binder A). The degree of swelling in electrolysis solution, glass transition temperature, and gel content of the second particulate binder A were then measured with the above-described methods. Table 1 lists the results.

<Preparation of Slurry Composition for Negative Electrode for a Lithium Ion Secondary Battery>

100 parts of the negative electrode active material A were placed in a planetary mixer with disper, and 1 part in terms of solid content of a 1% aqueous solution of carboxymethyl cellulose ("MAC800LC" produced by NIPPON PAPER Chemicals CO., LTD.) was added thereto as a water soluble polymer. This mixture was adjusted with deionized water to a solid content concentration of 56% and then mixed at 25° C. for 60 minutes.

Next, the mixture was adjusted with deionized water to a solid content concentration of 52% and further mixed at 25° C. for 15 minutes to obtain a mixed solution.

1.5 parts in terms of solid content of a particulate binder composed of the first particulate binder A and the second particulate binder A (first particulate binder A/second particulate binder A=100/20 (mass ratio)) were then added to the above-described mixed solution, and the mixed solution was adjusted with deionized water to a final solid content concentration of 46% and further mixed for 10 minutes. The mixture was defoamed under reduced pressure to yield a slurry composition for a negative electrode.

<Production of Negative Electrode for a Lithium Ion Secondary Battery>

The prepared slurry composition for a negative electrode was applied onto 20 μm thick copper foil (current collector) with a comma coater to an application amount of 11 mg/cm$^2$ to 12 mg/cm$^2$ and dried. The drying was performed by transporting the copper foil at a speed of 0.5 m/min through an oven at 60° C. for 2 minutes. Subsequently, the copper foil was heated for two minutes at 120° C. to yield a web of negative electrode.

The resulting web was then pressed to a density of 1.50 g/cm$^3$ to 1.60 g/cm$^3$ in a role press to yield a negative electrode.

<Production of Positive Electrode for a Lithium Ion Secondary Battery>

100 parts of LiCoO$_2$ as a positive electrode active material, 2 parts of acetylene black (HS-100 produced by Denki Kagaku Kogyo Kabushiki Kaisha) as a conductive material, and 2 parts of PVDF (polyvinylidene difluoride; KF-1100 produced by Kureha Corporation) as a binder were injected into a planetary mixer, N-methylpyrrolidone was further added so that the overall solid content concentration reached 67%, and the result was mixed to yield a slurry composition for a positive electrode.

The resulting slurry composition for a positive electrode was applied onto 20 μm thick aluminum foil (current collector) with a comma coater and dried. The drying was performed by transporting the aluminum foil at a speed of 0.5 m/min through an oven at 60° C. for 2 minutes. Subsequently, the aluminum foil was heated for two minutes at 120° C. to yield a web of positive electrode.

The resulting web of positive electrode was then pressed to a density of 3.40 g/cm$^3$ to 3.50 g/cm$^3$ in a role press to yield a positive electrode.

<Preparation of Lithium Ion Secondary Battery>

A single-layer polypropylene separator (width 65 mm, length 500 mm, thickness 25 μm, produced by a dry method, porosity 55%) was prepared and cut out as a 5 cm×5 cm square. An aluminum packing case was prepared as the casing of the battery.

The produced positive electrode was cut into a 4 cm×4 cm square and disposed so that the front face, i.e. the current collector side, was in contact with the aluminum packing case. Next, a square separator was disposed on the surface of the positive electrode mixed material layer side of the positive electrode. Furthermore, the produced negative electrode was cut into a 4.2 cm×4.2 cm square and disposed on the separator so that the front face, i.e. the negative electrode mixed material layer side, was facing the separator. Subsequently, the aluminum packing case was filled with a 1.0 M concentration LiPF$_6$ solution as the electrolysis solution (where the solvent was a mixed solvent of ethylene carbonate/ethylmethyl carbonate=3/7 (volume ratio), and 2% by mass (solvent ratio) of vinylene carbonate was added as an additive). Furthermore, in order to tightly seal the opening of the aluminum packing case, the aluminum packing case was closed by heat sealing at 150° C. to produce a laminated cell-type lithium ion secondary battery.

The initial swelling, initial cycle characteristics, cycle characteristics, post-cycle swelling, and rate characteristics were evaluated for the produced lithium ion secondary battery. Table 1 lists the results.

Examples 2 to 4

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that particulate binders in which the blending ratio of the first particulate binder A and the second particulate binder A was changed to the ratio listed in Table 1 were used. Evaluation was made similarly as for Example 1. Table 1 lists the results.

Example 5

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the first particulate binder A, a first particulate binder B was used, which had a degree of swelling in electrolysis solution of 180% by mass and was prepared similarly to the first particulate binder A except for using, as monomers, 8 parts of acrylonitrile as a vinyl cyanide monomer in addition to 65 parts of styrene, 35 parts of 1,3-butadiene, 4 parts of itaconic acid, and 1 part of 2-hydroxyethyl acrylate. Evaluation was made similarly as for Example 1. Table 1 lists the results.

Example 6

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the first particulate binder A, a first particulate binder C was used, which had a degree of swelling in electrolysis solution of 120% by mass and was prepared similarly to the first particulate binder A except for changing the content of t-dodecyl mercaptan to 0.2 parts. Evaluation was made similarly as for Example 1. Table 1 lists the results.

Example 7

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the first particulate binder A, a first particulate binder D was used, which had a degree of swelling in electrolysis solution of 200% by mass and was prepared similarly to the first particulate binder A except for using, as monomers, 12 parts of acrylonitrile as a vinyl cyanide monomer in addition to 65 parts of styrene, 35 parts of 1,3-butadiene, 4 parts of itaconic acid, and 1 part of 2-hydroxyethyl acrylate. Evaluation was made similarly as for Example 1. Table 1 lists the results.

Example 8

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the second particulate binder A, a second particulate binder B was used, which had a degree of swelling in electrolysis solution of 400% by mass and was prepared similarly to the second particulate binder A except for changing the content of acrylonitrile at the time of polymerizing the second polymer component to 20 parts. Evaluation was made similarly as for Example 1. Table 1 lists the results.

Example 9

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the second particulate binder A, a second particulate binder C was used, which had a degree of swelling in electrolysis solution of 570% by mass and was prepared similarly to the second particulate binder A except for changing the content of acrylonitrile at the time of polymerizing the second polymer component to 40 parts. Evaluation was made similarly as for Example 1. Table 1 lists the results.

Example 10

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the second particulate binder A, a second particulate binder D was used, which had a degree of swelling in electrolysis solution of 600% by mass and was prepared similarly to the second particulate binder A except for changing the content of acrylonitrile at the time of polymerizing the second polymer component to 45 parts. Evaluation was made similarly as for Example 1. Table 1 lists the results.

Examples 11 to 15

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that negative electrode active material having the mixing ratio of carbon-based negative electrode active material and silicon-based negative electrode active material A listed in Table 1 was used, and the content of the particulate binder was set to the content listed in Table 1. Evaluation was made similarly as for Example 1. Table 1 lists the results.

Example 16

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the first particulate binder A, a first particulate binder E was used, which had a gel content of 75% by mass and was prepared similarly to the first particulate binder A except for changing the content of t-dodecyl mercaptan to 0.6 parts. Evaluation was made similarly as for Example 1. Table 2 lists the results.

Example 17

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the first particulate binder A, a first particulate binder F was used, which had a glass transition temperature of −10° C. and was prepared similarly to the first particulate binder A except for changing the content of styrene to 55 parts and the content of 1,3-butadiene to 45 parts. Evaluation was made similarly as for Example 1. Table 2 lists the results.

Example 18

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the first particulate binder A, a first particulate binder G was used, which had a glass transition temperature of 30° C. and was prepared similarly to the first particulate binder A except for changing the content of styrene to 75 parts and the content of 1,3-butadiene to 25 parts. Evaluation was made similarly as for Example 1. Table 2 lists the results.

Examples 19 to 22

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the second particulate binder A, second particulate binders E to H were used, which had the glass transition temperatures listed in Table 2 and were prepared by changing the content of acrylonitrile and 1,3-butadiene when polymerizing the first polymer component and the contents of 1,3-butadiene and styrene when polymerizing the second polymer component. Evaluation was made similarly as for Example 1. Table 2 lists the results.

In the second particulate binder E, 30 parts of acrylonitrile and 70 parts of 1,3-butadiene were used when polymerizing the first polymer component, and 10 parts of 1,3-butadiene and 33 parts of styrene were used when polymerizing the second polymer component. In the second particulate binder F, 60 parts of acrylonitrile and 40 parts of 1,3-butadiene were used when polymerizing the first polymer component, and 20 parts of 1,3-butadiene and 22 parts of styrene were used when polymerizing the second polymer component. In the second particulate binder G, 30 parts of acrylonitrile and 70 parts of 1,3-butadiene were used when polymerizing the first polymer component, and 20 parts of 1,3-butadiene and 22 parts of styrene were used when polymerizing the second polymer component. In the second particulate binder H, 60 parts of acrylonitrile and 40 parts of 1,3-butadiene were used when polymerizing the first polymer component, and 10 parts of 1,3-butadiene and 33 parts of styrene were used when polymerizing the second polymer component.

Example 23

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the second particulate binder A, a second particulate binder I was used, which had a gel content of 75% by mass and was prepared similarly to the second particulate binder A except for changing the content of t-dodecyl mercaptan at the time of polymerizing the first polymer component to 0.4 parts. Evaluation was made similarly as for Example 1. Table 2 lists the results.

Example 24

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that a 1% aqueous solution of carboxymethyl cellulose ("MAC350HC" produced by NIPPON PAPER Chemicals CO., LTD.) was used as the water soluble polymer. Evaluation was made similarly as for Example 1. Table 2 lists the results.

Example 25

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that polystyrene sulfonic acid (sulfonic acid-based polymer, PSS, produced by Tosoh Organic Chemical Co., Ltd.) was used as the water soluble polymer. Evaluation was made similarly as for Example 1. Table 2 lists the results.

Example 26

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that a water soluble polymer A produced by the following method was used as the water soluble polymer. Evaluation was made similarly as for Example 1. Table 2 lists the results.
<Preparation of Water Soluble Polymer A>
Into a 5 MPa pressure tight container with an agitator, 30 parts of methacrylic acid as an ethylenically unsaturated carboxylic acid monomer, 7.5 parts of 2,2,2-trifluoroethyl methacrylate as a fluorine-containing (meth)acrylic acid ester monomer, 60.5 parts of butyl acrylate as a (meth) acrylic acid ester monomer, 0.8 parts of ethylene dimethacrylate (cross-linkable monomer) as another monomer, 1.2 parts of polyoxyalkylene alkenyl ether ammonium sulfate (reactive surfactant monomer, "LATEMUL PD-104" manufactured by Kao Corporation), 0.6 parts of t-dodecyl mercaptan as a molecular weight modifier, 150 parts of deionized water, and 0.5 parts of potassium persulfate as a polymerization initiator were injected and thoroughly stirred. The result was then heated to 60° C. to begin polymerization. When the amount of monomer consumed reached 96%, the mixture was cooled to stop the reaction, yielding a mixture including an aqueous dispersion-type polymer.
10% ammonia water was added to the mixture including the aqueous dispersion-type polymer, and the mixture was adjusted to pH 8 to yield an aqueous solution including the desired water soluble polymer A.

Example 27

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that a mixture of a 1% aqueous solution of carboxymethyl cellulose ("MAC800LC" produced by NIPPON PAPER Chemicals CO., LTD.) and the water soluble polymer A (MAC800LC/water soluble polymer A=8/2 (mass ratio in terms of solid content)) was used as the water soluble polymer. Evaluation was made similarly as for Example 1. Table 2 lists the results.

Example 28

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that a negative electrode active material B produced by the following method was used as the negative electrode active material. Evaluation was made similarly as for Example 1. Table 2 lists the results.
<Production of Negative Electrode Active Material B>
Using a bead mill, 100 parts of silicon monoxide (produced by OSAKA Titanium Technologies Co., Ltd.) and 8 parts of polyvinyl alcohol (reagent grade, produced by Tokyo Chemical Industry Co., Ltd.) were wet-milled to coat the surface of silicon monoxide particles. Subsequently, after drying the mixture into cake form in a nitrogen atmosphere, heat treatment was applied at 500° C. in an argon atmosphere to yield a complex compound such that SiO is dispersed into the matrix of conductive carbon (carbon coated SiO). The resulting carbon-coated SiO was then classified to produce silicon-based negative electrode active material B composed of carbon-coated SiO of less than 325 mesh.
95 parts of artificial graphite (specific surface area: 4 $m^2$/g, volume average particle size: 24.5 μm) as carbon-based negative electrode active material and 5 parts of the silicon-based negative electrode active material B were then mixed with a dry powder mixer to yield the negative electrode active material B.

Examples 29 to 30

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 28, except that negative electrode active material having the mixing ratio of carbon-based negative electrode active material and silicon-based negative electrode active material B listed in Table 2 was used, and the content of the particulate binder was set to the content listed in Table 2. Evaluation was made similarly as for Example 1. Table 2 lists the results.

Example 31

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that a negative electrode active material C produced by the following method was used as the negative electrode active material. Evaluation was made similarly as for Example 1. Table 2 lists the results.

<Preparation of Negative Electrode Active Material C>

Using a bead mill, 98 parts of silicon monoxide (produced by OSAKA Titanium Technologies Co., Ltd.), 20 parts of natural graphite, and 2 parts of polyvinyl alcohol (reagent grade, produced by Tokyo Chemical Industry Co., Ltd.) were wet-milled to coat the surface of silicon monoxide particles. Subsequently, after drying the mixture into cake form in a nitrogen atmosphere, heat treatment was applied at 120° C. in an argon atmosphere to yield a complex compound such that a portion of the Si in SiO was replaced with conductive carbon (SiO—C). The resulting SiO—C was then classified to produce silicon-based negative electrode active material C composed of SiO—C of less than 325 mesh.

95 parts of artificial graphite (specific surface area: 4 m²/g, volume average particle size: 24.5 μm) as carbon-based negative electrode active material and 5 parts of the silicon-based negative electrode active material C were then mixed with a dry powder mixer to yield the negative electrode active material C.

Examples 32 to 33

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 31, except that negative electrode active material having the mixing ratio of carbon-based negative electrode active material and silicon-based negative electrode active material C listed in Table 2 was used, and the content of the particulate binder was set to the content listed in Table 2. Evaluation was made similarly as for Example 1. Table 2 lists the results.

Example 34

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that a negative electrode active material D produced by the following method was used as the negative electrode active material. Evaluation was made similarly as for Example 1. Table 2 lists the results.

<Preparation of Negative Electrode Active Material D>

95 parts of artificial graphite (specific surface area: 4 m²/g, volume average particle size: 24.5 μm) as carbon-based negative electrode active material and 5 parts of Si (reagent grade, produced by Kojundo Chemical Lab. Co., Ltd.) as the silicon-based negative electrode active material D were mixed with a dry powder mixer to yield the negative electrode active material D.

Examples 35 to 36

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 34, except that negative electrode active material having the mixing ratio of carbon-based negative electrode active material and silicon-based negative electrode active material D listed in Table 2 was used, and the content of the particulate binder was set to the content listed in Table 2. Evaluation was made similarly as for Example 1. Table 2 lists the results.

Example 37

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of a particulate binder composed of the first particulate binder A and the second particulate binder A (first particulate binder A/second particulate binder A=100/20 (mass ratio)), 1.5 parts in terms of solid content of a particulate binder composed of the first particulate binder A, the second particulate binder A, and a third particulate binder A produced by the following method (first particulate binder A/second particulate binder A/third particulate binder A=79.2/12.5/8.3 (mass ratio)) were used. The initial swelling, initial cycle characteristics, cycle characteristics, post-cycle swelling, and rate characteristics were evaluated similarly as for Example 1. The low temperature rate characteristics were also evaluated and compared with the low temperature rate characteristics of the lithium ion secondary battery of Example 1. Table 3 lists the results.

<Method of Producing Third Particulate Binder A>

Into a 5 MPa pressure tight container with an agitator, 95 parts of butyl acrylate as a (meth)acrylic acid ester monomer, 2 parts of acrylonitrile as a monomer containing a nitrile group, 1 part of allyl methacrylate as a cross-linkable monomer, 2 parts of methacrylic acid as an ethylenically unsaturated monocarboxylic acid monomer, 0.4 parts of sodium dodecylbenzenesulfonate as an emulsifier, 150 parts of deionized water, and 0.5 parts of potassium persulfate as a polymerization initiator were injected and thoroughly stirred. The result was then heated to 50° C. to begin polymerization. When the polymer conversion rate reached 96%, the mixture was cooled to stop the reaction. A 5% sodium hydroxide aqueous solution was added to the resulting aqueous dispersion including a copolymer for adjustment to pH 8. Subsequently, the unreacted monomer was removed by distillation under heating and reduced pressure. The result was then cooled to 30° C. or less to obtain an aqueous dispersion including a copolymer (aqueous dispersion of the third particulate binder A). The glass transition temperature and surface acid content of the third particulate binder A were then measured with the above-described methods. Table 3 lists the results.

Examples 38 to 39

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 37, except that particulate binders in which the blending ratio of the first particulate binder A, the second particulate binder A, and the third particulate binder A was changed to the ratios listed in

43

Table 3 were used. Evaluation was made similarly as for Example 37. Table 3 lists the results.

Example 40

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 38, except that instead of the third particulate binder A, a third particulate binder B was used, which was prepared similarly to the third particulate binder A except for using 96.7 parts of butyl acrylate, 2 parts of acrylonitrile, 1 part of allyl methacrylate, and 0.3 parts of methacrylic acid as monomers. Evaluation was made similarly as for Example 38. Table 3 lists the results.

Example 41

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 38, except that instead of the third particulate binder A, a third particulate binder C was used, which was prepared similarly to the third particulate binder A except for using 93.5 parts of butyl acrylate, 2 parts of acrylonitrile, 1 part of allyl methacrylate, and 3.5 parts of methacrylic acid as monomers. Evaluation was made similarly as for Example 38. Table 3 lists the results.

Comparative Example 1

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the first particulate binder A, a first particulate binder H was used, which had a gel content of 60% by mass and was prepared similarly to the first particulate binder A except for changing the content of t-dodecyl mercaptan to 0.8 parts. Evaluation was made similarly as for Example 1. Table 4 lists the results.

Comparative Example 2

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the first particulate binder A, a first particulate binder I was used, which had a glass transition temperature of 70° C. and was prepared similarly to the first particulate binder A except for changing the content of styrene to 90 parts and the content of 1,3-butadiene to 10 parts. Evaluation was made similarly as for Example 1. Table 4 lists the results.

Comparative Example 3

A slurry composition for a negative electrode for a lithium ion secondary battery, a negative electrode for a lithium ion secondary battery, a positive electrode for a lithium ion

44 secondary battery, and a lithium ion secondary battery were produced in a similar way as in Example 1, except that instead of the first particulate binder A, a first particulate binder J was used, which had a glass transition temperature of −40° C. and was prepared similarly to the first particulate binder A except for changing the content of styrene to 35 parts and the content of 1,3-butadiene to 65 parts. Evaluation was made similarly as for Example 1. Table 4 lists the results.

Comparative Example 4

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the first particulate binder A, a first particulate binder K was used, which had a degree of swelling in electrolysis solution of 220% by mass and was prepared similarly to the first particulate binder A except for using, as monomers, 15 parts of acrylonitrile as a vinyl cyanide monomer in addition to 65 parts of styrene, 35 parts of 1,3-butadiene, 4 parts of itaconic acid, and 1 part of 2-hydroxyethyl acrylate. Evaluation was made similarly as for Example 1. Table 4 lists the results.

Comparative Example 5

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the second particulate binder A, a second particulate binder J was used, which had a degree of swelling in electrolysis solution of 620% by mass and was prepared similarly to the second particulate binder A except for changing the content of acrylonitrile at the time of polymerizing the first polymer component to 50 parts. Evaluation was made similarly as for Example 1. Table 4 lists the results.

Comparative Example 6

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that instead of the second particulate binder A, a second particulate binder K was used, which had a degree of swelling in electrolysis solution of 150% by mass and was prepared similarly to the second particulate binder A except for changing the content of acrylonitrile at the time of polymerizing the first polymer component to 5 parts. Evaluation was made similarly as for Example 1. Table 4 lists the results.

Comparative Example 7

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that only the first particulate binder A was used as the particulate binder. Evaluation was made similarly as for Example 1. Table 4 lists the results.

Comparative Example 8

A slurry composition for a negative electrode for a lithium ion secondary battery, a negative electrode for a lithium ion secondary battery, a positive electrode for a lithium ion secondary battery, and a lithium ion secondary battery were produced in a similar way as in Example 1, except that only the second particulate binder A was used as the particulate binder. Evaluation was made similarly as for Example 1. Table 4 lists the results.

TABLE 1

|  |  |  | Example 1 | Example 2 | Example 3 | Example 4 | Example 5 | Example 6 |
|---|---|---|---|---|---|---|---|---|
| Negative electrode active material | Carbon-based active material | | Artificial graphite | Artificial graphite | Artificial graphite | Artificial graphite | Artificial graphite | Artificial graphite |
| | Silicon-based active material | | Active material A | Active material A | Active material A | Active material A | Active material A | Active material A |
| | Mixing ratio (carbon-based active material/silicon-based active material) | | 95/5 | 95/5 | 95/5 | 95/5 | 95/5 | 95/5 |
| | Content of negative electrode active material [parts by mass] | | 100 | 100 | 100 | 100 | 100 | 100 |
| Particulate binder | First particulate binder | Type | Binder A | Binder A | Binder A | Binder A | Binder B | Binder C |
| | | Degree of swelling in electrolyte solution [% by mass] | 150 | 150 | 150 | 150 | 180 | 120 |
| | | Glass transition temperature [° C.] | 10 | 10 | 10 | 10 | 10 | 10 |
| | | Gel content [% by mass] | 93 | 93 | 93 | 93 | 93 | 93 |
| | | Styrene/butadiene ratio | 65/35 | 65/35 | 65/35 | 65/35 | 65/35 | 65/35 |
| | Second particulate binder | Type | Binder A | Binder A | Binder A | Binder A | Binder A | Binder A |
| | | Degree of swelling in electrolyte solution [% by mass] | 530 | 530 | 530 | 530 | 530 | 530 |
| | | Glass transition temperature (1) [° C.] | −37 | −37 | −37 | −37 | −37 | −37 |
| | | Glass transition temperature (2) [° C.] | 35 | 35 | 35 | 35 | 35 | 35 |
| | | Gel content [% by mass] | 85 | 85 | 85 | 85 | 85 | 85 |
| | Blending ratio (first particulate binder/second particulate binder) | | 100/20 | 100/10 | 100/60 | 100/100 | 100/20 | 100/20 |
| | Content of particulate binder [parts by mass] | | 1.5 | 1.5 | 1.5 | 1.5 | 1.5 | 1.5 |
| Water soluble polymer | Type | | MAC800LC | MAC800LC | MAC800LC | MAC800LC | MAC800LC | MAC800LC |
| | Content of water soluble polymer [parts by mass] | | 1 | 1 | 1 | 1 | 1 | 1 |
| Initial swelling | | | A | B | B | B | B | A |
| Initial cycle characteristics | | | A | A | A | A | A | A |
| Post-cycle swelling | | | A | A | B | C | B | A |
| Cycle characteristics | | | A | A | A | B | A | B |
| Rate characteristics | | | A | A | A | B | A | B |

|  |  |  | Example 7 | Example 8 | Example 9 | Example 10 | Example 11 |
|---|---|---|---|---|---|---|---|
| Negative electrode active material | Carbon-based active material | | Artificial graphite | Artificial graphite | Artificial graphite | Artificial graphite | Artificial graphite |
| | Silicon-based active material | | Active material A | Active material A | Active material A | Active material A | Active material A |
| | Mixing ratio (carbon-based active material/silicon-based active material) | | 95/5 | 95/5 | 95/5 | 95/5 | 85/15 |
| | Content of negative electrode active material [parts by mass] | | 100 | 100 | 100 | 100 | 100 |
| Particulate binder | First particulate binder | Type | Binder D | Binder A | Binder A | Binder A | Binder A |
| | | Degree of swelling in electrolyte solution [% by mass] | 200 | 150 | 150 | 150 | 150 |
| | | Glass transition temperature [° C.] | 10 | 10 | 10 | 10 | 10 |
| | | Gel content [% by mass] | 93 | 93 | 93 | 93 | 93 |
| | | Styrene/butadiene ratio | 65/35 | 65/35 | 65/35 | 65/35 | 65/35 |
| | Second particulate binder | Type | Binder A | Binder B | Binder C | Binder D | Binder A |
| | | Degree of swelling in electrolyte solution [% by mass] | 530 | 400 | 570 | 600 | 530 |
| | | Glass transition temperature (1) [° C.] | −37 | −37 | −37 | −37 | −37 |
| | | Glass transition | 35 | 35 | 35 | 35 | 35 |

TABLE 1-continued

|  |  |  |  | | | | | |
|---|---|---|---|---|---|---|---|---|
|  |  | temperature (2) [° C.] |  | | | | | |
|  |  | Gel content [% by mass] |  | 85 | 85 | 85 | 85 | 85 |
|  |  | Blending ratio (first particulate binder/second particulate binder) |  | 100/20 | 100/20 | 100/20 | 100/20 | 100/20 |
|  |  | Content of particulate binder [parts by mass] |  | 1.5 | 1.5 | 1.5 | 1.5 | 1.5 |
| Water soluble polymer | Type |  |  | MAC800LC | MAC800LC | MAC800LC | MAC800LC | MAC800LC |
|  | Content of water soluble polymer [parts by mass] |  |  | 1 | 1 | 1 | 1 | 1 |
| Initial swelling |  |  |  | B | A | B | B | B |
| Initial cycle characteristics |  |  |  | A | A | A | A | B |
| Post-cycle swelling |  |  |  | C | A | B | C | B |
| Cycle characteristics |  |  |  | A | A | A | A | B |
| Rate characteristics |  |  |  | A | B | A | A | A |

|  |  |  |  | Example 12 | Example 13 | Example 14 | Example 15 |
|---|---|---|---|---|---|---|---|
| Negative electrode active material | Carbon-based active material |  |  | Artificial graphite | Artificial graphite | Artificial graphite | Artificial graphite |
|  | Silicon-based active material |  |  | Active material A | Active material A | Active material A | Active material A |
|  | Mixing ratio (carbon-based active material/silicon-based active material) |  |  | 70/30 | 70/30 | 50/50 | 50/50 |
|  | Content of negative electrode active material [parts by mass] |  |  | 100 | 100 | 100 | 100 |
| Particulate binder | First particulate binder | Type |  | Binder A | Binder A | Binder A | Binder A |
|  |  | Degree of swelling in electrolyte solution [% by mass] |  | 150 | 150 | 150 | 150 |
|  |  | Glass transition temperature [° C.] |  | 10 | 10 | 10 | 10 |
|  |  | Gel content [% by mass] |  | 93 | 93 | 93 | 93 |
|  |  | Styrene/butadiene ratio |  | 65/35 | 65/35 | 65/35 | 65/35 |
|  | Second particulate binder | Type |  | Binder A | Binder A | Binder A | Binder A |
|  |  | Degree of swelling in electrolyte solution [% by mass] |  | 530 | 530 | 530 | 530 |
|  |  | Glass transition temperature (1) [° C.] |  | −37 | −37 | −37 | −37 |
|  |  | Glass transition temperature (2) [° C.] |  | 35 | 35 | 35 | 35 |
|  |  | Gel content [% by mass] |  | 85 | 85 | 85 | 85 |
|  | Blending ratio (first particulate binder/second particulate binder) |  |  | 100/20 | 100/20 | 100/20 | 100/20 |
|  | Content of particulate binder [parts by mass] |  |  | 1.5 | 2 | 1.5 | 3 |
| Water soluble polymer | Type |  |  | MAC800LC | MAC800LC | MAC800LC | MAC800LC |
|  | Content of water soluble polymer [parts by mass] |  |  | 1 | 1 | 1 | 1 |
| Initial swelling |  |  |  | B | B | C | C |
| Initial cycle characteristics |  |  |  | B | B | C | C |
| Post-cycle swelling |  |  |  | B | B | C | C |
| Cycle characteristics |  |  |  | B | B | B | B |
| Rate characteristics |  |  |  | A | C | B | C |

TABLE 2

|  |  |  | Example 16 | Example 17 | Example 18 | Example 19 | Example 20 | Example 21 |
|---|---|---|---|---|---|---|---|---|
| Negative electrode active material | Carbon-based active material |  | Artificial graphite | Artificial graphite | Artificial graphite | Artificial graphite | Artificial graphite | Artificial graphite |
|  | Silicon-based active material |  | Active material A | Active material A | Active material A | Active material A | Active material A | Active material A |
|  | Mixing ratio (carbon-based active material/silicon-based active material) |  | 95/5 | 95/5 | 95/5 | 95/5 | 95/5 | 95/5 |
|  | Content of negative electrode active material [parts by mass] |  | 100 | 100 | 100 | 100 | 100 | 100 |
| Particulate binder | First particulate binder | Type | Binder E | Binder F | Binder G | Binder A | Binder A | Binder A |
|  |  | Degree of swelling in electrolyte solution [% by mass] | 150 | 150 | 150 | 150 | 150 | 150 |
|  |  | Glass transition | 10 | −10 | 30 | 10 | 10 | 10 |

TABLE 2-continued

| | | | | | | | | |
|---|---|---|---|---|---|---|---|---|
| | | temperature [° C.] | | | | | | |
| | | Gel content [% by mass] | 75 | 93 | 93 | 93 | 93 | 93 |
| | | Styrene/butadiene ratio | 65/35 | 55/45 | 75/25 | 65/35 | 65/35 | 65/35 |
| | Second particulate binder | Type | Binder A | Binder A | Binder A | Binder E | Binder F | Binder G |
| | | Degree of swelling in electrolyte solution [% by mass] | 530 | 530 | 530 | 530 | 530 | 530 |
| | | Glass transition temperature (1) [° C.] | −37 | −37 | −37 | −40 | −10 | −40 |
| | | Glass transition temperature (2) [° C.] | 35 | 35 | 35 | 45 | 25 | 25 |
| | | Gel content [% by mass] | 85 | 85 | 85 | 85 | 85 | 85 |
| | Blending ratio (first particulate binder/second particulate binder) | | 100/20 | 100/20 | 100/20 | 100/20 | 100/20 | 100/20 |
| | Content of particulate binder [parts by mass] | | 1.5 | 1.5 | 1.5 | 1.5 | 1.5 | 1.5 |
| Water soluble polymer | Type | | MAC800LC | MAC800LC | MAC800LC | MAC800LC | MAC800LC | MAC800LC |
| | Content of water soluble polymer [parts by mass] | | 1 | 1 | 1 | 1 | 1 | 1 |
| Initial swelling | | | C | B | B | B | B | B |
| Initial cycle characteristics | | | B | B | B | B | B | B |
| Post-cycle swelling | | | C | A | B | A | A | A |
| Cycle characteristics | | | B | A | B | A | A | A |
| Rate characteristics | | | B | A | B | A | A | A |

| | | | Example 22 | Example 23 | Example 24 | Example 25 | Example 26 |
|---|---|---|---|---|---|---|---|
| Negative electrode active material | Carbon-based active material | | Artificial graphite | Artificial graphite | Artificial graphite | Artificial graphite | Artificial graphite |
| | Silicon-based active material | | Active material A | Active material A | Active material A | Active material A | Active material A |
| | Mixing ratio (carbon-based active material/silicon-based active material) | | 95/5 | 95/5 | 95/5 | 95/5 | 95/5 |
| | Content of negative electrode active material [parts by mass] | | 100 | 100 | 100 | 100 | 100 |
| Particulate binder | First particulate binder | Type | Binder A | Binder A | Binder A | Binder A | Binder A |
| | | Degree of swelling in electrolyte solution [% by mass] | 150 | 150 | 150 | 150 | 150 |
| | | Glass transition temperature [° C.] | 10 | 10 | 10 | 10 | 10 |
| | | Gel content [% by mass] | 93 | 93 | 93 | 93 | 93 |
| | | Styrene/butadiene ratio | 65/35 | 65/35 | 65/35 | 65/35 | 65/35 |
| | Second particulate binder | Type | Binder H | Binder I | Binder A | Binder A | Binder A |
| | | Degree of swelling in electrolyte solution [% by mass] | 530 | 530 | 530 | 530 | 530 |
| | | Glass transition temperature (1) [° C.] | −10 | −37 | −37 | −37 | −37 |
| | | Glass transition temperature (2) [° C.] | 45 | 35 | 35 | 35 | 35 |
| | | Gel content [% by mass] | 85 | 75 | 85 | 85 | 85 |
| | Blending ratio (first particulate binder/second particulate binder) | | 100/20 | 100/20 | 100/20 | 100/20 | 100/20 |
| | Content of particulate binder [parts by mass] | | 1.5 | 1.5 | 1.5 | 1.5 | 1.5 |
| Water soluble polymer | Type | | MAC800LC | MAC800LC | MAC350LC | PSS | Polymer A |
| | Content of water soluble polymer [parts by mass] | | 1 | 1 | 1 | 1 | 1 |
| Initial swelling | | | B | B | B | B | B |
| Initial cycle characteristics | | | B | B | B | B | B |
| Post-cycle swelling | | | A | B | B | A | A |
| Cycle characteristics | | | A | B | A | A | A |
| Rate characteristics | | | A | A | A | A | A |

| | | | Example 27 | Example 28 | Example 29 | Example 30 | Example 31 |
|---|---|---|---|---|---|---|---|
| Negative electrode active material | Carbon-based active material | | Artificial graphite | Artificial graphite | Artificial graphite | Artificial graphite | Artificial graphite |
| | Silicon-based active material | | Active material A | Active material B | Active material B | Active material B | Active material C |
| | Mixing ratio (carbon-based active material/silicon-based active material) | | 95/5 | 95/5 | 85/15 | 70/30 | 95/5 |

TABLE 2-continued

|  |  |  |  |  |  |  |  |
|---|---|---|---|---|---|---|---|
|  |  | Content of negative electrode active material [parts by mass] | 100 | 100 | 100 | 100 | 100 |
| Particulate binder | First particulate binder | Type | Binder A | Binder A | Binder A | Binder A | Binder A |
|  |  | Degree of swelling in electrolyte solution [% by mass] | 150 | 150 | 150 | 150 | 150 |
|  |  | Glass transition temperature [° C.] | 10 | 10 | 10 | 10 | 10 |
|  |  | Gel content [% by mass] | 93 | 93 | 93 | 93 | 93 |
|  |  | Styrene/butadiene ratio | 65/35 | 65/35 | 65/35 | 65/35 | 65/35 |
|  | Second particulate binder | Type | Binder A | Binder A | Binder A | Binder A | Binder A |
|  |  | Degree of swelling in electrolyte solution [% by mass] | 530 | 530 | 530 | 530 | 530 |
|  |  | Glass transition temperature (1) [° C.] | −37 | −37 | −37 | −37 | −37 |
|  |  | Glass transition temperature (2) [° C.] | 35 | 35 | 35 | 35 | 35 |
|  |  | Gel content [% by mass] | 85 | 85 | 85 | 85 | 85 |
|  | Blending ratio (first particulate binder/second particulate binder) |  | 100/20 | 100/20 | 100/20 | 100/20 | 100/20 |
|  | Content of particulate binder [parts by mass] |  | 1.5 | 1.5 | 2 | 3 | 1.5 |
| Water soluble polymer | Type |  | Mixture | MAC800LC | MAC800LC | MAC800LC | MAC800LC |
|  | Content of water soluble polymer [parts by mass] |  | 1 | 1 | 1 | 1 | 1 |
| Initial swelling |  |  | B | B | B | C | B |
| Initial cycle characteristics |  |  | A | B | B | B | B |
| Post-cycle swelling |  |  | A | B | B | B | B |
| Cycle characteristics |  |  | A | A | B | B | A |
| Rate characteristics |  |  | A | A | A | A | A |

|  |  |  | Example 32 | Example 33 | Example 34 | Example 35 | Example 36 |
|---|---|---|---|---|---|---|---|
| Negative electrode active material | Carbon-based active material |  | Artificial graphite | Artificial graphite | Artificial graphite | Artificial graphite | Artificial graphite |
|  | Silicon-based active material |  | Active material C | Active material C | Active material D | Active material D | Active material D |
|  | Mixing ratio (carbon-based active material/silicon-based active material) |  | 85/15 | 70/30 | 95/5 | 85/15 | 70/30 |
|  | Content of negative electrode active material [parts by mass] |  | 100 | 100 | 100 | 100 | 100 |
| Particulate binder | First particulate binder | Type | Binder A | Binder A | Binder A | Binder A | Binder A |
|  |  | Degree of swelling in electrolyte solution [% by mass] | 150 | 150 | 150 | 150 | 150 |
|  |  | Glass transition temperature [° C.] | 10 | 10 | 10 | 10 | 10 |
|  |  | Gel content [% by mass] | 93 | 93 | 93 | 93 | 93 |
|  |  | Styrene/butadiene ratio | 65/35 | 65/35 | 65/35 | 65/35 | 65/35 |
|  | Second particulate binder | Type | Binder A | Binder A | Binder A | Binder A | Binder A |
|  |  | Degree of swelling in electrolyte solution [% by mass] | 530 | 530 | 530 | 530 | 530 |
|  |  | Glass transition temperature (1) [° C.] | −37 | −37 | −37 | −37 | −37 |
|  |  | Glass transition temperature (2) [° C.] | 35 | 35 | 35 | 35 | 35 |
|  |  | Gel content [% by mass] | 85 | 85 | 85 | 85 | 85 |
|  | Blending ratio (first particulate binder/second particulate binder) |  | 100/20 | 100/20 | 100/20 | 100/20 | 100/20 |
|  | Content of particulate binder [parts by mass] |  | 2 | 3 | 1.5 | 2 | 3 |
| Water soluble polymer | Type |  | MAC800LC | MAC800LC | MAC800LC | MAC800LC | MAC800LC |
|  | Content of water soluble polymer [parts by mass] |  | 1 | 1 | 1 | 1 | 1 |
| Initial swelling |  |  | B | C | B | B | C |
| Initial cycle characteristics |  |  | B | B | B | B | C |
| Post-cycle swelling |  |  | B | B | B | B | B |
| Cycle characteristics |  |  | B | B | A | B | B |
| Rate characteristics |  |  | A | A | A | A | A |

TABLE 3

|  |  |  | Example 1 | Example 37 | Example 38 | Example 39 | Example 40 | Example 41 |
|---|---|---|---|---|---|---|---|---|
| Negative electrode active material | Carbon-based active material | | Artificial graphite | Artificial graphite | Artificial graphite | Artificial graphite | Artificial graphite | Artificial graphite |
| | Silicon-based active material | | Active material A | Active material A | Active material A | Active material A | Active material A | Active material A |
| | Mixing ratio (carbon-based active material/silicon-based active material) | | 95/5 | 95/5 | 95/5 | 95/5 | 95/5 | 95/5 |
| | Content of negative electrode active material [parts by mass] | | 100 | 100 | 100 | 100 | 100 | 100 |
| Participate binder | First particulate binder | Type | Binder A | Binder A | Binder A | Binder A | Binder A | Binder A |
| | | Degree of swelling in electrolyte solution [% by mass] | 150 | 150 | 150 | 150 | 150 | 150 |
| | | Glass transition temperature [° C.] | 10 | 10 | 10 | 10 | 10 | 10 |
| | | Gel content [% by mass] | 93 | 93 | 93 | 93 | 93 | 93 |
| | | Styrene/butadiene ratio | 65/35 | 65/35 | 65/35 | 65/35 | 65/35 | 65/35 |
| | Second particulate binder | Type | Binder A | Binder A | Binder A | Binder A | Binder A | Binder A |
| | | Degree of swelling in electrolyte solution [% by mass] | 530 | 530 | 530 | 530 | 530 | 530 |
| | | Glass transition temperature (1) [° C.] | −37 | −37 | −37 | −37 | −37 | −37 |
| | | Glass transition temperature (2) [° C.] | 35 | 35 | 35 | 35 | 35 | 35 |
| | | Gel content [% by mass] | 85 | 85 | 85 | 85 | 85 | 85 |
| | Third particulate binder | Type | — | Binder A | Binder A | Binder A | Binder B | Binder C |
| | | Glass transition temperature [° C.] | — | −30 | −30 | −30 | −37 | −26 |
| | | Degree of swelling in electrolyte solution [% by mass] | — | 350 | 350 | 350 | 360 | 330 |
| | | Gel content [% by mass] | — | 90 | 90 | 90 | 88 | 87 |
| | | Surface acid content [mmol/g] | — | 0.080 | 0.080 | 0.080 | 0.020 | 0.097 |
| | Blending ratio (first particulate binder/second particulate binder/third particulate binder) | | 83.3/16.7/0 | 79.2/12.5/8.3 | 45/45/10 | 77.3/4.5/18.2 | 45/45/10 | 45/45/10 |
| | Content of particulate binder [parts by mass] | | 1.5 | 1.5 | 1.5 | 1.5 | 1.5 | 1.5 |
| Water soluble polymer | Type | | MAC800LC | MAC800LC | MAC800LC | MAC800LC | MAC800LC | MAC800LC |
| | Content of water soluble polymer [parts by mass] | | 1 | 1 | 1 | 1 | 1 | 1 |
| Initial swelling | | | A | A | A | B | A | A |
| Initial cycle characteristics | | | A | A | A | A | A | A |
| Post-cycle swelling | | | A | A | A | B | A | A |
| Cycle characteristics | | | A | A | A | A | A | A |
| Rate characteristics | | | A | A | A | A | A | A |
| Low temperature rate characteristics | | | B | A | A | A | A | A |

TABLE 4

|  |  |  | Comparative Example 1 | Comparative Example 2 | Comparative Example 3 | Comparative Example 4 | Comparative Example 5 |
|---|---|---|---|---|---|---|---|
| Negative electrode active material | Carbon-based active material | | Artificial graphite | Artificial graphite | Artificial graphite | Artificial graphite | Artificial graphite |
| | Silicon-based active material | | Active material A | Active material A | Active material A | Active material A | Active material A |
| | Mixing ratio (carbon-based active material/silicon-based active material) | | 95/5 | 95/5 | 95/5 | 95/5 | 95/5 |
| | Content of negative electrode active material [parts by mass] | | 100 | 100 | 100 | 100 | 100 |
| Particulate binder | First particulate binder | Type | Binder H | Binder I | Binder J | Binder K | Binder A |
| | | Degree of swelling in electrolyte solution [% by mass] | 150 | 150 | 150 | 220 | 150 |
| | | Glass transition temperature [° C.] | 10 | 70 | −40 | 10 | 10 |
| | | Gel content [% by mass] | 60 | 93 | 93 | 93 | 93 |

TABLE 4-continued

|  |  |  |  |  |  |  |  |
|---|---|---|---|---|---|---|---|---|
|  |  | Styrene/butadiene ratio | 65/35 | 90/10 | 35/65 | 65/35 | 65/35 |
|  | Second particulate binder | Type | Binder A | Binder A | Binder A | Binder A | Binder J |
|  |  | Degree of swelling in electrolyte solution [% by mass] | 530 | 530 | 530 | 530 | 620 |
|  |  | Glass transition temperature (1) [° C.] | −37 | −37 | −37 | −37 | −37 |
|  |  | Glass transition temperature (2) [° C.] | 35 | 35 | 35 | 35 | 35 |
|  |  | Gel content [% by mass] | 85 | 85 | 85 | 85 | 85 |
|  | Blending ratio (first particulate binder/second particulate binder) |  | 100/20 | 100/20 | 100/20 | 100/20 | 100/20 |
|  | Content of particulate binder [parts by mass] |  | 1.5 | 1.5 | 1.5 | 1.5 | 1.5 |
| Water soluble polymer | Type |  | MAC800LC | MAC800LC | MAC800LC | MAC800LC | MAC800LC |
|  | Content of water soluble polymer [parts by mass] |  | 1 | 1 | 1 | 1 | 1 |
| Initial swelling |  |  | D | D | D | D | D |
| Initial cycle characteristics |  |  | C | C | D | D | D |
| Post-cycle swelling |  |  | D | D | D | D | D |
| Cycle characteristics |  |  | D | D | D | D | D |
| Rate characteristics |  |  | C | C | C | C | C |

|  |  |  |  | Comparative Example 6 | Comparative Example 7 | Comparative Example 8 |
|---|---|---|---|---|---|---|
|  | Negative electrode active material | Carbon-based active material |  | Artificial graphite | Artificial graphite | Artificial graphite |
|  |  | Silicon-based active material |  | Active material A | Active material A | Active material A |
|  |  | Mixing ratio (carbon-based active material/silicon-based active material) |  | 95/5 | 95/5 | 95/5 |
|  |  | Content of negative electrode active material [parts by mass] |  | 100 | 100 | 100 |
|  | Particulate binder | First particulate binder | Type | Binder A | Binder A | — |
|  |  |  | Degree of swelling in electrolyte solution [% by mass] | 150 | 150 | — |
|  |  |  | Glass transition temperature [° C.] | 10 | 10 | — |
|  |  |  | Gel content [% by mass] | 93 | 93 | — |
|  |  |  | Styrene/butadiene ratio | 65/35 | 65/35 | — |
|  |  | Second particulate binder | Type | Binder K | — | Binder A |
|  |  |  | Degree of swelling in electrolyte solution [% by mass] | 150 | — | 530 |
|  |  |  | Glass transition temperature (1) [° C.] | −37 | — | −37 |
|  |  |  | Glass transition temperature (2) [° C.] | 35 | — | 35 |
|  |  |  | Gel content [% by mass] | 85 | — | 85 |
|  |  | Blending ratio (first particulate binder/second particulate binder) |  | 100/20 | — | — |
|  |  | Content of particulate binder [parts by mass] |  | 1.5 | 1.5 | 1.5 |
|  | Water soluble polymer | Type |  | MAC800LC | MAC800LC | MAC800LC |
|  |  | Content of water soluble polymer [parts by mass] |  | 1 | 1 | 1 |
|  | Initial swelling |  |  | C | B | D |
|  | Initial cycle characteristics |  |  | C | D | D |
|  | Post-cycle swelling |  |  | C | B | D |
|  | Cycle characteristics |  |  | D | D | D |
|  | Rate characteristics |  |  | D | D | C |

Tables 1 and 2 show that in Examples 1 to 36, which used a first particulate binder and second particulate binder having predetermined properties and a water soluble polymer, the swelling of the negative electrode due to charging and discharging can be suppressed both initially and post-cycle, while also improving the electrical characteristics of the lithium ion secondary battery.

Table 3 shows that in Examples 37 to 41 as well, which used a first particulate binder and second particulate binder having predetermined properties, a third particulate binder and a water soluble polymer, the swelling of the negative electrode due to charging and discharging can be suppressed both initially and post-cycle, while also improving the electrical characteristics of the lithium ion secondary battery.

Conversely, Table 4 shows that in Comparative Examples 1 to 6, which used a first particulate binder and second particulate binder not having predetermined properties, and in Comparative Examples 7 and 8, which did not concomitantly use a first particulate binder and second particulate binder, it was not possible to suppress swelling of the negative electrode while improving the electrical characteristics of the lithium ion secondary battery.

In particular, Examples 1 to 4 in Table 1 show that swelling of the negative electrode can be sufficiently suppressed while sufficiently improving the electrical characteristics of the lithium ion secondary battery by adjusting the blending ratio of the first particulate binder and the second particulate binder.

Examples 1, 5 to 10, and 16 to 23 in Tables 1 and 2 also show that swelling of the negative electrode can be sufficiently suppressed while sufficiently improving the electrical characteristics of the lithium ion secondary battery by adjusting the degree of swelling in electrolysis solution, glass transition temperature, and gel content of the first particulate binder and the second particulate binder.

Furthermore, Examples 1 and 11 to 15 in Table 1 show that swelling of the negative electrode can be suppressed even if the content of the silicon-based negative electrode active material is high. Examples 1 and 24 to 36 in Tables 1 and 2 also show that even if the type of water soluble polymer or silicon-based negative electrode active material is changed, the swelling of the negative electrode due to charging and discharging can be suppressed, while also improving the electrical characteristics of the lithium ion secondary battery.

Examples 1 and 37 to 41 in Table 3 also show that the low temperature rate characteristics of the lithium ion secondary battery can be improved by concomitantly using a first particulate binder, second particulate binder, and third particulate binder. Furthermore, Examples 37 to 41 in Table 3 show that the low temperature rate characteristics can be improved while sufficiently suppressing the swelling of the negative electrode due to charging and discharging both initially and post-cycle by adjusting the blending ratio of the first particulate binder, the second particulate binder, and the third particulate binder.

INDUSTRIAL APPLICABILITY

The disclosed slurry composition for a negative electrode for a lithium ion secondary battery allows for the formation of a negative electrode for a lithium ion secondary battery that can both suppress swelling due to charging and discharging and can improve the electrical characteristics of the lithium ion secondary battery.

The disclosed negative electrode for a lithium ion secondary battery both allows for suppression of swelling due to charging and discharging and also for improvement in the electrical characteristics of the lithium ion secondary battery.

Furthermore, the disclosed lithium ion secondary battery can both suppress swelling of the negative electrode and can attain excellent electrical characteristics.

The invention claimed is:

1. A slurry composition for a negative electrode for a lithium ion secondary battery, the slurry composition comprising:
a negative electrode active material, a particulate binder, a water soluble polymer, and water, wherein
the particulate binder comprises a first particulate binder and a second particulate binder,
the first particulate binder comprises a copolymer (A) including an aliphatic conjugated diene monomer unit and an aromatic vinyl monomer unit, has a degree of swelling in electrolysis solution of 110% by mass or more to 200% by mass or less, has a glass transition temperature of −30° C. or higher to 60° C. or lower, and has a gel content of 70% by mass or more to 98% by mass or less, and
the second particulate binder is a particulate binder formed by a composite polymer composed of a copolymer (B) and a polymer other than the copolymer (B), has a degree of swelling in electrolysis solution of 250% by mass or more to 600% by mass or less, and has a gel content of 70% by mass or more to 98% by mass or less, where
the copolymer (B) includes an aliphatic conjugated diene monomer unit and an aromatic vinyl monomer unit, and
the polymer other than the copolymer (B) includes at least an aliphatic conjugated diene monomer unit, and does not include an aromatic vinyl monomer unit or includes an aromatic vinyl monomer unit in an amount less than the amount of the aromatic vinyl monomer unit in the copolymer (B).

2. The slurry composition for a negative electrode for a lithium ion secondary battery of claim 1, wherein the second particulate binder has at least one glass transition temperature in a range of −100° C. or higher to lower than 10° C. and at least one glass transition temperature in a range of 10° C. or higher to 100° C. or lower.

3. The slurry composition for a negative electrode for a lithium ion secondary battery of claim 1, wherein in terms of solid content, 1 part by mass or more to 100 parts by mass or less of the second particulate binder is included per 100 parts by mass of the first particulate binder.

4. The slurry composition for a negative electrode for a lithium ion secondary battery of claim 1, wherein
the particulate binder further comprises a third particulate binder, and
the third particulate binder comprises a copolymer (C) including a (meth)acrylic acid ester monomer unit and has a surface acid content of 0.01 mmol/g or more to 0.10 mmol/g or less.

5. The slurry composition for a negative electrode for a lithium ion secondary battery of claim 4, wherein in terms of solid content, 5 parts by mass or more to 30 parts by mass or less of the third particulate binder is included per 100 parts by mass of the particulate binder.

6. The slurry composition for a negative electrode for a lithium ion secondary battery of claim 1, wherein the negative electrode active material comprises a carbon-based negative electrode active material and a silicon-based negative electrode active material.

7. The slurry composition for a negative electrode for a lithium ion secondary battery of claim 6, wherein 1 part by mass or more to 100 parts by mass or less of the silicon-based negative electrode active material is included per 100 parts by mass of the carbon-based negative electrode active material.

8. The slurry composition for a negative electrode for a lithium ion secondary battery of claim 6, wherein the silicon-based negative electrode active material comprises $SiO_x$ (where $0.01 \leq x < 2$) containing (i) at least one of SiO and $SiO_2$ and (ii) Si.

9. The slurry composition for a negative electrode for a lithium ion secondary battery of claim 6, wherein the silicon-based negative electrode active material comprises a complex compound of a Si-containing material and conductive carbon.

10. A negative electrode for a lithium ion secondary battery formed by:
  applying the slurry composition for a negative electrode for a lithium ion secondary battery of claim 1 onto a current collector, and
  drying the slurry composition for a negative electrode for a lithium ion secondary battery that was applied onto the current collector so as to form a negative electrode mixed material layer on the current collector.

11. A lithium ion secondary battery comprising the negative electrode for a lithium ion secondary battery of claim 10.

\* \* \* \* \*